United States Patent
Bovino

(10) Patent No.: US 9,279,656 B2
(45) Date of Patent: Mar. 8, 2016

(54) INTERFEROMETER AND METHOD FOR CONTROLLING THE COALESCENCE OF A PAIR OF PHOTONS

(75) Inventor: Fabio Antonio Bovino, Rome (IT)

(73) Assignee: SELEX SISTEMI INTEGRATI S.p.A., Roma (IT)

( * ) Notice: Subject to any disclaimer, the term of this patent is extended or adjusted under 35 U.S.C. 154(b) by 366 days.

(21) Appl. No.: 13/543,299

(22) Filed: Jul. 6, 2012

(65) Prior Publication Data

US 2013/0176573 A1    Jul. 11, 2013

(30) Foreign Application Priority Data

Jul. 8, 2011 (IT) .............................. TO2011A0602

(51) Int. Cl.
*G01B 9/02* (2006.01)
*H04L 9/08* (2006.01)

(52) U.S. Cl.
CPC ........ *G01B 9/02001* (2013.01); *G01B 9/02014* (2013.01); *H04L 9/0852* (2013.01); *G01B 2290/55* (2013.01)

(58) Field of Classification Search
CPC ....................................................... G01B 9/02
USPC ....................................................... 356/450
See application file for complete search history.

(56) References Cited

PUBLICATIONS

"Quantum interference by two temporally distinguishable pulses", department of physics, University of Maryland, Apr. 6, 1999, by Yoon-Ho-Kim et al (herein after Yoon).*

"Hong-Ou-Mandel interferometer with cavities: theory", Mar. 29, 2005, by C. Olindo et al (herein after Olindo).*
Search Report from Italian Application No. TO2011000602 dated Feb. 15, 2012.
Walther, P. et al., "De Broglie wavelength of a non-local four-photon state," Nature, vol. 429, No. 6988, pp. 158-161 (2004).
De Martini, F, "Quantum superposition of parametrically amplified multiphoton pure states," Physics Letters A, vol. 250, No. 1-3, pp. 15-19 (1998).
Fiurasek, J., et al., "Quantum cloning of a pair of orthogonally polarized photons with linear optics," Physical Review A, vol. 77, No. 5, pp. 052308-1-052308-7 (2008).

* cited by examiner

*Primary Examiner* — Tarifur Chowdhury
*Assistant Examiner* — Jamil Ahmed
(74) *Attorney, Agent, or Firm* — Workman Nydegger

(57) ABSTRACT

An interferometer for controlling the coalescence of a pair of photons, including: an optical source, which generates a first and a second pump pulse coherent with each other and shifted in time by a delay; and a first interferometric stage, which receives the first pump pulse and generates an antisymmetric state with two coalescent photons $(1/\sqrt{2}(|2_1,0_2\rangle - |0_1,2_2\rangle))$. The interferometer also includes a second interferometric stage, which receives the second pump pulse and generates a symmetric state with two coalescent photons $(1/\sqrt{2} \cdot (|2_1, 0_2\rangle + |0_1, 2_2\rangle))$, the first and the second interferometric stages being connected in a manner such that the interferometer outputs a final state equal to a weighted sum of the antisymmetric state and of the symmetric state $(1/\sqrt{2} \cdot (|2_1, 0_2\rangle + |0_1, 2_2\rangle) + e^{i\tau} \cdot 1/\sqrt{2} \cdot (|2_1, 0_2\rangle - |0_1, 2_2\rangle))$, the weights of the sum being a function of the delay.

8 Claims, 9 Drawing Sheets

INTERFEROMETER AND METHOD FOR CONTROLLING THE COALESCENCE OF A PAIR OF PHOTONS

CROSS-REFERENCE TO RELATED APPLICATIONS

This application claims priority to Italian Patent Application No. TO2011A000602 filed on 8 Jul. 2011, the contents of which are incorporated herein, in their entirety, by this reference.

TECHNICAL FIELD

The present invention relates to an interferometer and method for controlling the coalescence of a pair of photons.

BACKGROUND

As is known, devices have been proposed that are able to reveal the quantum behaviour of Nature. In particular, devices are known that enable detection of the quantum behaviour of particles such as, for example, photons. The operation of these devices is based on single or multiple photon state processing and finds application in particularly advanced sectors such as, for example, quantum computing, quantum cryptography, quantum communications and even random number generation.

In particular, the so-called Hong-Ou-Mandel interferometer, also known as the HOM interferometer, is also known, an example of which is shown in FIG. 1, where it is indicated with reference numeral 1.

In detail, the HOM interferometer 1 comprises an optical source 2, a crystal 4, a delay line 6, a polarization phase-shifter 8, first and second mirrors 10, 12 and an optical beam splitter 14. The HOM interferometer 1 also comprises a beam stopper 16.

In greater detail, the optical source 2 is a coherent type of source, such as a laser source for example.

The crystal 4 is an optically non-linear crystal such as, for example, a non-centrosymmetric crystal (for example, a crystal of barium borate, BBO), and is aligned with the optical source 2.

The delay line 6 is of the optical type and is formed, for example, by a so-called optical trombone. In use, when it is crossed by a photon, the delay line 6 delays it for a predetermined time.

Whereas with regard to the polarization phase-shifter 8, this is formed by a birefringent crystal, which delays photons having different polarizations differently, namely by introducing controlled phase shifting, typically not greater than the wavelength of the photons. For example, the polarization phase-shifter 8 can be voltage controlled.

In greater detail, the crystal 4 defines, together with the delay line 6, the polarization phase-shifter 8 and the first mirror 10, a first optical path 20. The crystal 4 also defines, together with the second mirror 12, a second optical path 22. The delay line 6 is able to alter the optical length of the first optical path 20 with respect to the second optical path 22.

The optical beam splitter 14 is of the so-called 50/50 type and has a first and a second input and a first and a second output. From the classical point of view, given an incident signal on any input of the first and second inputs, two signals will be generated on the first and second outputs of the optical beam splitter 14 having power half that of the incident signal.

The first and second optical paths 20, 22 are optically and respectively connected to the first and second inputs of the optical beam splitter 14.

Operationally, the optical source 2 is able to emit electromagnetic pulses formed of photons at the same frequency, which are commonly referred to as pump photons; these electromagnetic pulses, and therefore the pump photons, impinge on the crystal 4.

In particular, assuming that a pump photon impinge on the crystal 4, due to the phenomenon of spontaneous parametric down-conversion (SPDC), the crystal 4 can generate a pair of converted photons, one of which propagates along the first optical path 20, while the other propagates along the second optical path 22. Instead, in the case where there is no spontaneous parametric down-conversion, the pump photon passes through the crystal 4 and is absorbed by the beam stopper 16, which, for this purpose, is arranged in front of the crystal 4, with which it is aligned.

In the case where two converted photons are generated, both of them propagate until reaching a respective input of the optical beam splitter 14. In this regard, generally, but not necessarily, the optical beam splitter 14 is formed by a pair of prisms suitable for receiving electromagnetic signals that propagate in free space, such that the term "input" implies a corresponding direction of propagation of an electromagnetic signal or a photon that impinges on the optical beam splitter 14, while the term "output" implies a corresponding direction of propagation of an electromagnetic signal or a photon that moves away from the optical beam splitter 14.

The term "first converted photon" is used to indicate the photon of the pair of converted photons that propagates along the first optical path 20; this photon arrives at the first input of the optical beam splitter 14 after having passed through the delay line 6 and the polarization phase-shifter 8, and also after being reflected by the first mirror 10. Furthermore, when the first converted photon impinges on the optical beam splitter 14, it can, alternatively and with the same probability, pass through the optical beam splitter 14, leaving from the first output of the optical beam splitter 14, or be reflected by the optical beam splitter 14, leaving from the second output of the optical beam splitter 14.

Similarly, the term "second converted photon" is used to indicate the photon of the pair of converted photons that propagates along the second optical path 22; this photon arrives at the second input of the optical beam splitter 14 after being reflected by the second mirror 12. Furthermore, when the second converted photon impinges on the optical beam splitter 14, it can, alternatively and with the same probability, pass through the optical beam splitter 14, leaving from the second output of the optical beam splitter 14, or can be reflected by the optical beam splitter 14, leaving from the first output of the optical beam splitter 14.

In other words, in the case where the first converted photon passes through the optical beam splitter 14, it does not change its direction of propagation. Conversely, when the first converted photon is reflected by the optical beam splitter 14, the direction of propagation is changed. Furthermore, the crystal 4, the first and second mirrors 10, 12 and the optical beam splitter 14 are arranged such that, in case of reflection, the first converted photon propagates with a direction of propagation equal to the direction of propagation with which the second converted photon impinges on the optical beam splitter 14.

Completely symmetrical considerations can be made regarding the second converted photon. In fact, in the case where second converted photon passes through the optical beam splitter 14, it does not change its direction of propagation. Conversely, when the second converted photon is reflected by the optical beam splitter 14, the direction of propagation is changed. Furthermore, the crystal 4, the first and second mirrors 10, 12 and the optical beam splitter 14 are arranged such that, in case of reflection, the second converted photon propagates with a direction of propagation equal to the direction of propagation with which the first converted photon impinges on the optical beam splitter 14.

Thus, in the case where first converted photon passes through the optical beam splitter 14 and the second converted photon is reflected by the optical beam splitter 14, they subsequently propagate along a same direction of propagation (first output of the optical beam splitter). Similarly, in the case where the first converted photon is reflected by the optical beam splitter 14 and the second photon passes through the optical beam splitter 14, they subsequently propagates along a same direction of propagation (second output of the optical beam splitter).

In order to detect the quantum behaviour of the photons, it is possible to prepare a first and a second photodetector 30, 32, both of the single photon type, i.e. able to detect individual photons. For example, the first and second photodetectors 30, 32 could be Geiger-mode avalanche photodiodes, also known as single-photon avalanche photodiodes (SPAD).

The first photodetector 30 is placed to detect the first converted photon if it passes through the optical beam splitter 14 and the second converted photon if it is reflected by the optical beam splitter 14. Similarly, the second photodetector 32 is placed to detect the first converted photon if it is reflected by the optical beam splitter 14 and the second converted photon if it passes through the optical beam splitter 14.

There are therefore four different possible scenarios for output from the optical beam splitter 14, detectable by using the first and second photodetectors 30, 32 and known as Feynman paths:

a) both the first and second converted photons pass through the optical beam splitter 14;

b) both the first and the second converted photon are reflected by the optical beam splitter 14;

c) the first converted photon passes through the optical beam splitter 14, while the second converted photon is reflected by the optical beam splitter 14; and d) the second converted photon passes through the optical beam splitter 14, while the first converted photon is reflected by the optical beam splitter 14.

From the quantum viewpoint, assuming (temporarily) for simplicity that the first and second converted photons have the same polarization, and assuming that the delay line 6 and the polarization phase-shifter 8 are such as to compensate possible differences in length between the first and second optical paths 20, 22, in a manner such that the first and second converted photons impinge on the optical beam splitter 14 at the same time, contrary to that foreseen by classical optics, it is found that scenarios a) a b) can never occur. In other words, the first and second converted photons always find themselves on the same output of the optical beam splitter 14. In particular, the probability that the first and second converted photons are on the first output of the optical beam splitter 14 is 0.5, and the probability that they are on the second output of the optical beam splitter 14 is 0.5.

Thus, the first and second converted photons cannot both be reflected or both be transmitted, and therefore both be detected by the same photodetector, whether this be the first photodetector 30 or the second photodetector 32. By monitoring the first and second photodetectors 30, 32, a total lack of coincidence between their measurements is therefore verified. This is due to destructive interference between different alternatives; in the case in point, between scenario a) and scenario b).

In general, the described phenomenon is usually referred to as coalescence, or that the first and second converted photons are coalescent.

More precisely, the phenomenon of coalescence of a pair of photons occurs when, as in the example described, it is not possible to distinguish between scenario a) and scenario b), for example, by measuring different arrival times of the first and second converted photons at the first and second photodetectors 30, 32.

According to one interpretation of the phenomenon of the coalescence of two photons, the optical beam splitter 14 is a linear device capable of discriminating between symmetric states, namely between invariant states with respect to particle exchange, and asymmetric states, also known as antisymmetric states.

In detail, a state of a system with two photons having the same polarization is symmetric, precisely because it is invariant with respect to the exchange of the two photons. In fact, when two photons impinge on two different inputs of an optical beam splitter of the 50/50 type, they are propagated together in output from the optical beam splitter, along the same direction.

By using the so-called Dirac notation, the input state to the optical beam splitter 14 is normally indicated $|1_1\rangle|1_2\rangle$, where the subscripts "1" and "2" refer to the first and the second optical path 20, 22 respectively. Regarding this, it is normal to still refer to the first output of the optical beam splitter 14 as the first optical path 20, and still refer to the second output of the optical beam splitter 14 as the second optical path 22, so that it is possible to express the output state of the optical beam splitter 14 as $1/\sqrt{2}(|2_1,0_2\rangle - |0_1,2_2\rangle)$, from which it can be inferred that there is only one antisymmetric state with two coalescent photons in output from the HOM interferometer 1.

More in detail, it is possible to remove the simplifying assumption in which the first and second converted photons have the same polarization, something that, in effect, does not occur in the case where, as shown in FIG. 1, they are generated by the crystal 4 through type-II spontaneous parametric down-conversion. In fact, in this case, the pump photon is annihilated and the first and second converted photons are generated with orthogonal polarizations; in other words, if one of the first and second converted photons propagates along the first optical path 20 with horizontal polarization, the other photon propagates on the second optical path 22 with vertical polarization, or vice versa.

In particular, in the case of so-called type-II spontaneous parametric down-conversion, it is found that the first and second converted photons are orthogonally polarized and satisfy the so-called phase-matching conditions, i.e. the conditions of conservation of energy and linear moment.

It thus occurs that one of the first and second converted photons is polarized in a direction parallel to the optical axis of the crystal 4, also known as the extraordinary direction, while the other is polarized in a direction perpendicular to the optical axis of the crystal 4, also known as the ordinary direction. Furthermore, due to conservation of the linear moment, as shown in FIG. 2, the first and second converted photons are respectively emitted along a first and a second emission cone 34, 36, respectively corresponding to the extraordinary direction and the ordinary direction.

More in detail, assuming the degenerate case, namely the case where the first and second converted photons both have frequencies equal to half of the frequency of the pump photon, the first and second converted photons emerge from the crystal 4 forming a precise angle, for example, respectively equal to ±3°, with respect to the direction of propagation of the pump photon, as shown in FIGS. 2 and 3 for example.

The first and second emission cones 34, 36 intersect along a first and a second line 38, 40, along which it is therefore possible to detect both the first and the second converted photons. In other words, along the first and second lines 38, 40 it is possible to detect polarized photons both along the extraordinary direction and along the ordinary direction. Therefore, the HOM interferometer 1 is such that the first and second optical paths 20, 22 respectively lie along the first and second lines 38, 40, which undergo obvious changes following the interaction of the first and second emission cones 34, 36 with the components of the HOM interferometer 1, such as, for example, the first and second mirrors 10, 12.

That having been said, using the term "extraordinary photon" to indicate the photon, of the first and second converted photons, polarized parallel to the optical axis of the crystal 4, and using the term "ordinary photon" to indicate the photon, of the first and second converted photons, polarized perpendicularly to the optical axis of the crystal 4, it is possible to discriminate between state $|e_1\rangle|o_2\rangle$ and state $|o_1\rangle|e_2\rangle$. In other words, it is possible to distinguish a scenario in which the extraordinary photon (also known as the "signal") and the ordinary photon (also known as the "idler") respectively propagate along the first and second optical path 20, 22 (state $|e_1\rangle|o_2\rangle$) from a scenario in which the extraordinary photon and the ordinary photon respectively propagate along the second and the first optical path 22, 20 (state $|o_1\rangle|e_2\rangle$). This is due to the fact that the extraordinary photon and the ordinary photon propagate in the crystal 4 with different group velocities, and so the corresponding emissions are temporally distinguishable.

In practice, the input state to the optical beam splitter 14 is still coherent and can be expressed as:

$$\frac{|e\rangle_1|o\rangle_2 + e^{j\varphi}|o\rangle_1|e\rangle_2}{\sqrt{2}} \quad (1)$$

where φ is a function of the phase shift introduced by the polarization phase-shifter 8.

In practice, by means of the delay line 6 and the polarization phase-shifter 8, it is possible to control the input state to the optical beam splitter 14, as well as the superposition of the wave function of the two-photon system on the optical beam splitter 14.

For example, when φ=0, the input state is symmetric and so coalescence of the photons occurs. Here, φ is such that the condition φ=0 is obtained when the delay introduced by the delay line 6 is sufficient to compensate the difference in optical length between the first and second optical paths 20, 22, and when the polarization phase-shifter 8 is inactive.

Conversely, in the case where φ=π, the following is obtained:

$$\frac{|e\rangle_1|o\rangle_2 - |o\rangle_1|e\rangle_2}{\sqrt{2}} \quad (2)$$

namely an antisymmetric state is obtained, also known as a singlet state. In particular, relation (2) can also be expressed as:

$$\frac{|1_{e1}\rangle|1_{2o}\rangle - |1_{1o}\rangle|1_{2e}\rangle}{\sqrt{2}} \quad (3)$$

where subscripts "1" and "2" still refer to the first and second optical paths 20, 22 and subscripts "e" and "o" refer to the extraordinary photon and the ordinary photon.

It can then be checked, both mathematically and experimentally, that the singlet state does not change, i.e. that the state on output from the optical beam splitter 14 still takes form (2), equivalent to form (3).

Therefore, the coalescence of the extraordinary photon and the ordinary photon does not occur in output from the optical beam splitter 14. Conversely, anti-coalescence occurs, since the extraordinary photon and the ordinary photon are always present on different outputs of the optical beam splitter 14. In other words, the optical beam splitter 14 implements a projection of the input state in the symmetric and antisymmetric subspaces, this projection also being known as Bell measurement.

By way of example, anti-coalescence can be detected, as shown in FIG. 4, by using a third and a fourth photodetectors 42, 44, and two further optical beam splitters, which are referred to as the first and second measurement splitters 46, 48. In particular, the first and second measurement splitters 46, 48 are polarizing optical beam splitters, each of which is able to let one of either the extraordinary photon or the ordinary photon pass through and to reflect the other one, so as to spatially separate the extraordinary photon and the ordinary photon. For example, the first measurement splitter 46 can be arranged on the first output of the optical beam splitter 14 in a manner such that, in the case where the extraordinary photon or the ordinary photon emerge from the first output of the optical beam splitter 14, they are respectively directed towards the first photodetector 30 and the third photodetector 42.

Similarly, the second measurement splitter 48 can be arranged on the second output of the optical beam splitter 14 in a manner such that, in the case where extraordinary photon or the ordinary photon emerge from the second output of the optical beam splitter 14, they are respectively directed towards the second photodetector 32 and the fourth photodetector 44.

In practice, by counting the readings of the first, second, third and fourth photodetectors 30, 32, 42, 44, it is possible to determine measurements related to the so-called probabilities 1e1o, 1e2o, 2e1o and 2e2o, i.e. the probabilities that:
  both the extraordinary photon and the ordinary photon are on the first output of the optical beam splitter 14;
  the extraordinary photon and the ordinary photon are, respectively, on the first and the second output of the optical beam splitter 14;
  the extraordinary photon and the ordinary photon are, respectively, on the second and the first output of the optical beam splitter 14; and
  both the extraordinary photon and the ordinary photon are on the second output of the optical beam splitter 14.

More in detail, the description concerning the input state to the optical beam splitter 14 can be rendered mathematically more accurate in relation to the physical phenomenon. In fact, by considering the longitudinal components of the electromagnetic fields associated with the photons, the emission state from the crystal 4 can be expressed as:

$$|\psi\rangle = \frac{C}{\sqrt{2}} \int_{-L}^{0} dz \int_{0}^{+\infty} dv_p E_p^{(+)}(v_p) e^{iv_p \Lambda z} \quad (4)$$

$$\int_{-\infty}^{+\infty} dv e^{-iDvz} \times \times \left[ \hat{a}_{1e}^{\dagger}\left(v + \frac{v_p + \Omega_p}{2}\right) \hat{a}_{2o}^{\dagger}\left(-v + \frac{v_p + \Omega_p}{2}\right) - \hat{a}_{2e}^{\dagger}\left(v + \frac{v_p + \Omega_p}{2}\right) \hat{a}_{1o}^{\dagger}\left(-v + \frac{v_p + \Omega_p}{2}\right) \right] |0\rangle$$

where C is a constant that depends on the power of the optical source 2, the interaction volume of the pump photons with the crystal 4 and the second-order, non-linear, effective tensor of the crystal 4. In addition, $E_p^{(+)}(v_p)$ is the spectral distribution of the pump, namely of the electromagnetic radiation emitted by the optical source 2, $\Omega_p$ is the central pump frequency and L is the length of the crystal 4, measured along the propagation direction of the pump. Moreover, $\hat{\alpha}_{1e}^{\dagger}$ and $\hat{\alpha}_{2e}^{\dagger}$ are the creation operators related to the extraordinary photon and to the first and second optical paths 20, 22, respectively; $\hat{\alpha}_{1o}^{\dagger}$ and $\hat{\alpha}_{2o}^{\dagger}$ are the creation operators related to the ordinary photon and to the first and second optical paths 20, 22, respectively. The following also hold:

$$\Lambda = \frac{1}{u_p} - \frac{1}{2}\left(\frac{1}{u_e} + \frac{1}{u_o}\right), \quad (5)$$

and $$D = \left(\frac{1}{u_e} - \frac{1}{u_o}\right), \quad (6)$$

where $u_p$, $u_e$ and $u_o$ are the group velocities in the crystal 4 of the pump, the extraordinary photon and the ordinary photon, respectively.

In practice, equation (4) permits revealing observance of the energy conservation condition in the generation process of the extraordinary photon and the ordinary photon.

The output state from the optical beam splitter 14 can thus be expressed as:

$$|\psi\rangle = \frac{Ce^{-i\left(\frac{\Omega_p}{2}\right)\zeta}}{2\sqrt{2}} \int_{-L}^{0} dz \int_{0}^{+\infty} dv_p E_p^{(+)}(v_p) e^{iv_p\left(\Lambda z - \frac{\zeta}{2}\right)} \int_{-\infty}^{+\infty} dv e^{-iDvz} \times \quad (7)$$

$$\left\{ \begin{bmatrix} \hat{a}_{1e}^{\dagger}\left(v + \frac{v_p + \Omega_p}{2}\right) \\ \hat{a}_{1o}^{\dagger}\left(-v + \frac{v_p + \Omega_p}{2}\right) \\ \hat{a}_{2e}^{\dagger}\left(v + \frac{v_p + \Omega_p}{2}\right) \\ \hat{a}_{2o}^{\dagger}\left(-v + \frac{v_p + \Omega_p}{2}\right) \end{bmatrix} (e^{iv\zeta} \pm e^{-iv\zeta}) + \begin{bmatrix} \hat{a}_{1e}^{\dagger}\left(v + \frac{v_p + \Omega_p}{2}\right) \\ \hat{a}_{2o}^{\dagger}\left(-v + \frac{v_p + \Omega_p}{2}\right) \\ \hat{a}_{2e}^{\dagger}\left(v + \frac{v_p + \Omega_p}{2}\right) \\ \hat{a}_{1o}^{\dagger}\left(-v + \frac{v_p + \Omega_p}{2}\right) \end{bmatrix} (e^{iv\zeta} \mp e^{-iv\zeta}) \right\} |0\rangle$$

where symbol "±" is intended to be "+" in the case when $\phi=0$ (symmetric input state) and "−" when $\phi=\pi$ (antisymmetric input state); furthermore, in equation (7), $\zeta$ is a time that is a function of the delay introduced by the delay line 6.

The above-mentioned (normalized) probabilities 1e1o, 1e2o, 2e1o and 2e2o, hereinafter respectively indicated as $HOM_{1e1o}$, $HOM_{1e2o}$, $HOM_{2e1o}$ and $HOM_{2e2o}$, can thus be expressed as:

$$HOM_{1e1o}(\zeta) = \frac{1}{4}\left[1 \pm Tri\left(\frac{\zeta}{DL}\right)e^{-2\sigma_p^2 \frac{\Lambda^2}{D^2}\zeta^2}\right], \quad (8)$$

$$HOM_{1e2o}(\zeta) = \frac{1}{4}\left[1 \mp Tri\left(\frac{\zeta}{DL}\right)e^{-2\sigma_p^2 \frac{\Lambda^2}{D^2}\zeta^2}\right],$$

$$HOM_{2e1o}(\zeta) = \frac{1}{4}\left[1 \mp Tri\left(\frac{\zeta}{DL}\right)e^{-2\sigma_p^2 \frac{\Lambda^2}{D^2}\zeta^2}\right]$$

$$HOM_{2e2o}(\zeta) = \frac{1}{4}\left[1 \pm Tri\left(\frac{\zeta}{DL}\right)e^{-2\sigma_p^2 \frac{\Lambda^2}{D^2}\zeta^2}\right],$$

where the following holds:

$$Tri(x) = \begin{cases} 0 & \text{for } |x| > \frac{1}{2} \\ (1 - 2|x|) & \text{for } |x| \le \frac{1}{2} \end{cases} \quad (9)$$

As shown in FIG. 5, in the case where the input state is symmetric, it is found that the probabilities (more precisely, the corresponding probability density functions) $HOM_{1e1o}$ and $HOM_{2e2o}$ have a maximum of 0.5 when $\zeta=0$. In other words, coalescence occurs, since the first and second converted photons are on the same output of the optical beam splitter 14, which, with a probability of 0.5, is the first output or, with the same probability, is the second output of the optical beam splitter 14.

As shown in FIG. 6, in the case where the input state is antisymmetric, it is found that the probabilities $HOM_{1e1o}$ and $HOM_{2e2o}$ are null when $\zeta=0$. In other words, anti-coalescence occurs, since the extraordinary photon and the ordinary photon are never present on the same output of the optical beam splitter 14.

From a practical standpoint, the HOM interferometer 1 has been used, among other things, in measuring the temporal uncertainty associated with the emission of a pair of photons by spontaneous parametric down-conversion, which is typically less than a picosecond. Still by way of example, the HOM interferometer 1 has also been used to test the Bell inequalities, to measure the tunneling time of the photons, to perform quantum teleportation, and even to build quantum logic gates, to clone quantum states and to implement quantum key distribution schemes.

Even though the HOM interferometer 1 enables generating the coalescence of two photons and consequently lends itself to various applications based on the quantum characteristics of matter, it does not allow its outputs to be controlled, i.e. the probabilities with which the two coalescent photons appear on the first or on the second output of the optical beam splitter 14.

SUMMARY

An object of one or more embodiments of the present invention is to provide an interferometer that at least partially resolves the drawbacks of the known art. According to one or more embodiments of the present invention, an interferometer and method for controlling the coalescence of a pair of photons are provided.

In an embodiment, an interferometer for controlling the coalescence of a pair of photons includes an optical source configured to generate a first pump pulse and a second pump pulse coherent with each other and shifted in time by a delay. The interferometer includes first interferometric means configured to receive the first pump pulse and generate an antisymmetric state with two coalescent photons ($1/\sqrt{2}(|2_1, 0_2\rangle - |0_1, 2_2\rangle)$), and second interferometric means configured to receive the second pump pulse and to generate a symmetric state with two coalescent photons ($1/\sqrt{2}\cdot(|2_1, 0_2\rangle + |0_1, 2_2\rangle)$). The first and second interferometric means are connected so that the interferometer is configured to output a final state equal to a weighted sum of the antisymmetric state and the symmetric state ($1/\sqrt{2}\cdot(|2_1, 0_2\rangle + |0_1, 2_2\rangle) + e^{j\tau} \cdot 1/\sqrt{2}\cdot(|2_1, 0_2\rangle - |0_1, 2_2\rangle)$), the weights of the sum being a function of the delay.

BRIEF DESCRIPTION OF THE DRAWINGS

For a better understanding of the invention, some embodiments will now be described, purely by way of non-limitative example and with reference to the attached drawings, where.

DETAILED DESCRIPTION

Figure 1:
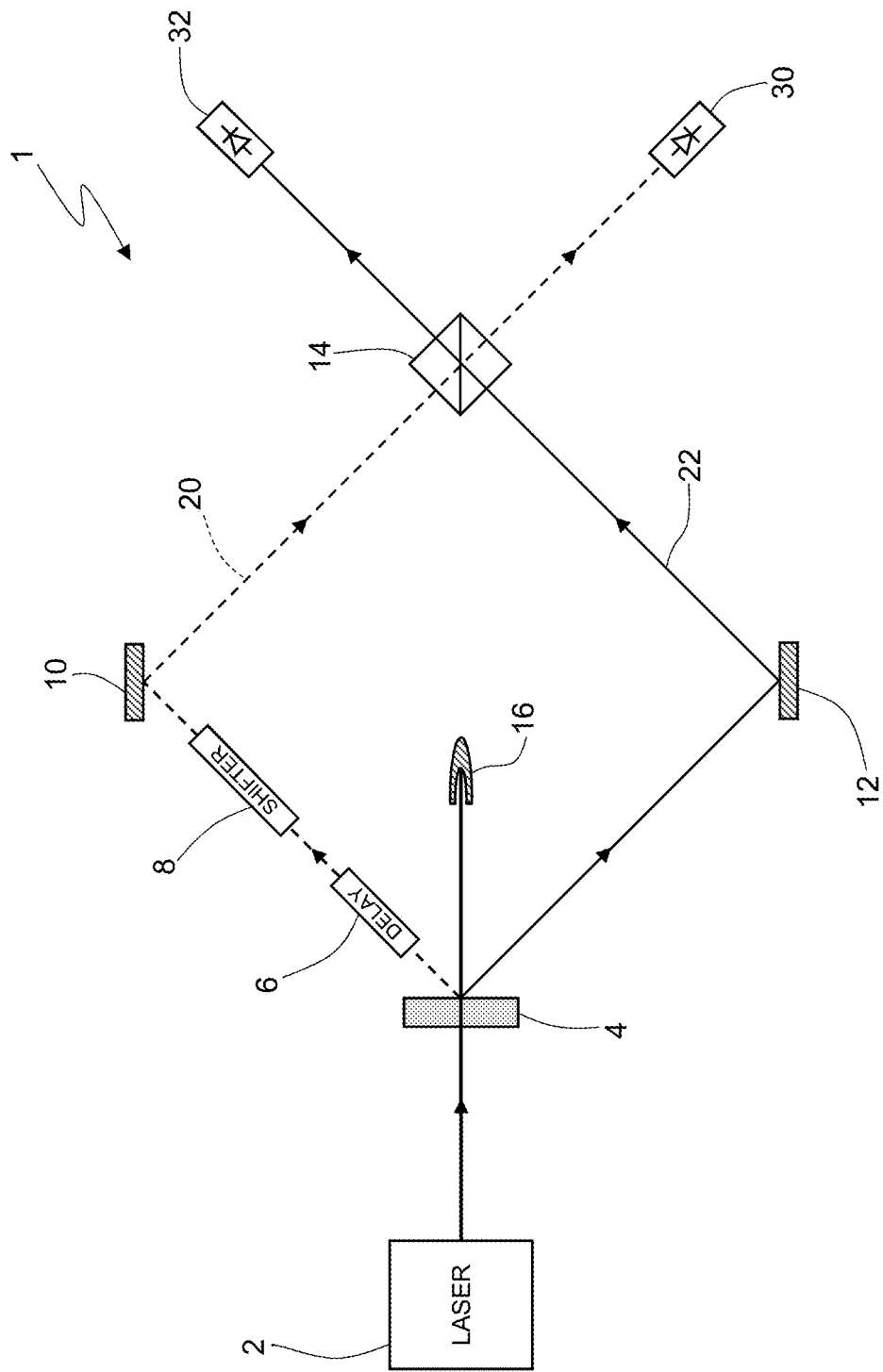
FIGS. 1 and 4 show block diagrams of a known type of interferometer.
Figure 2:
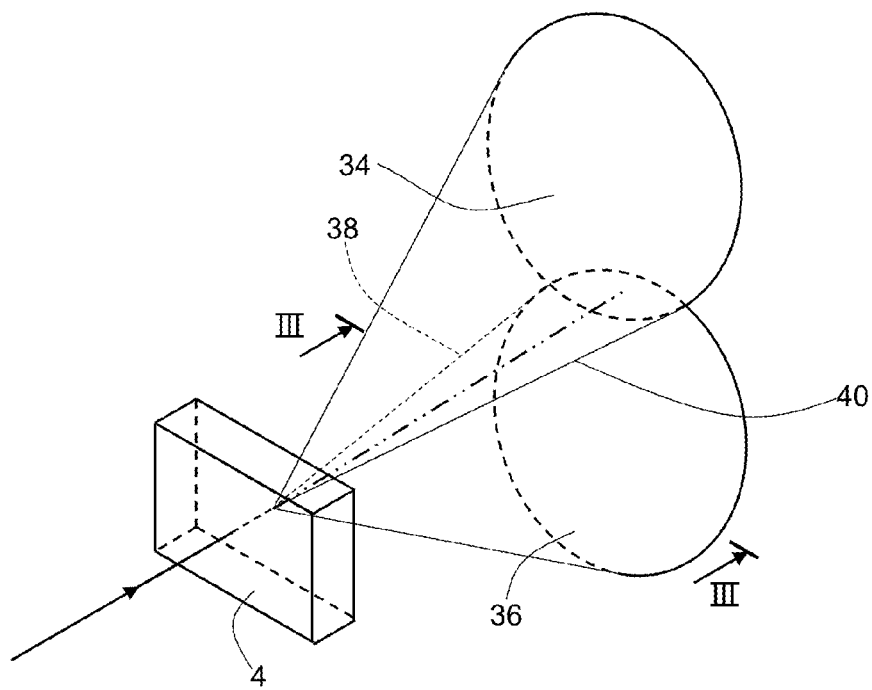
FIG. 2 schematically shows a perspective view of a crystal of the interferometer shown in FIGS. 1 and 4, and of two emission cones, related to an extraordinary photon and an ordinary photon.
Figure 3:
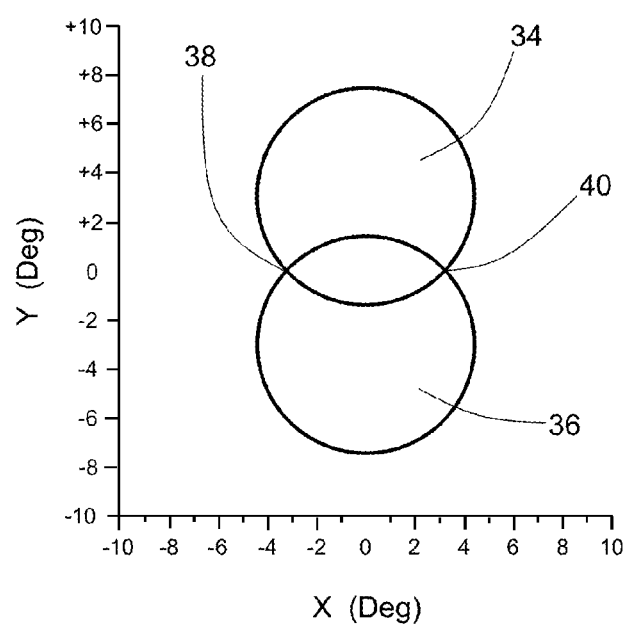
FIG. 3 shows a cross-section of the two emission cones shown in FIG. 2, taken along a section line shown in FIG. 2.
Figure 4:
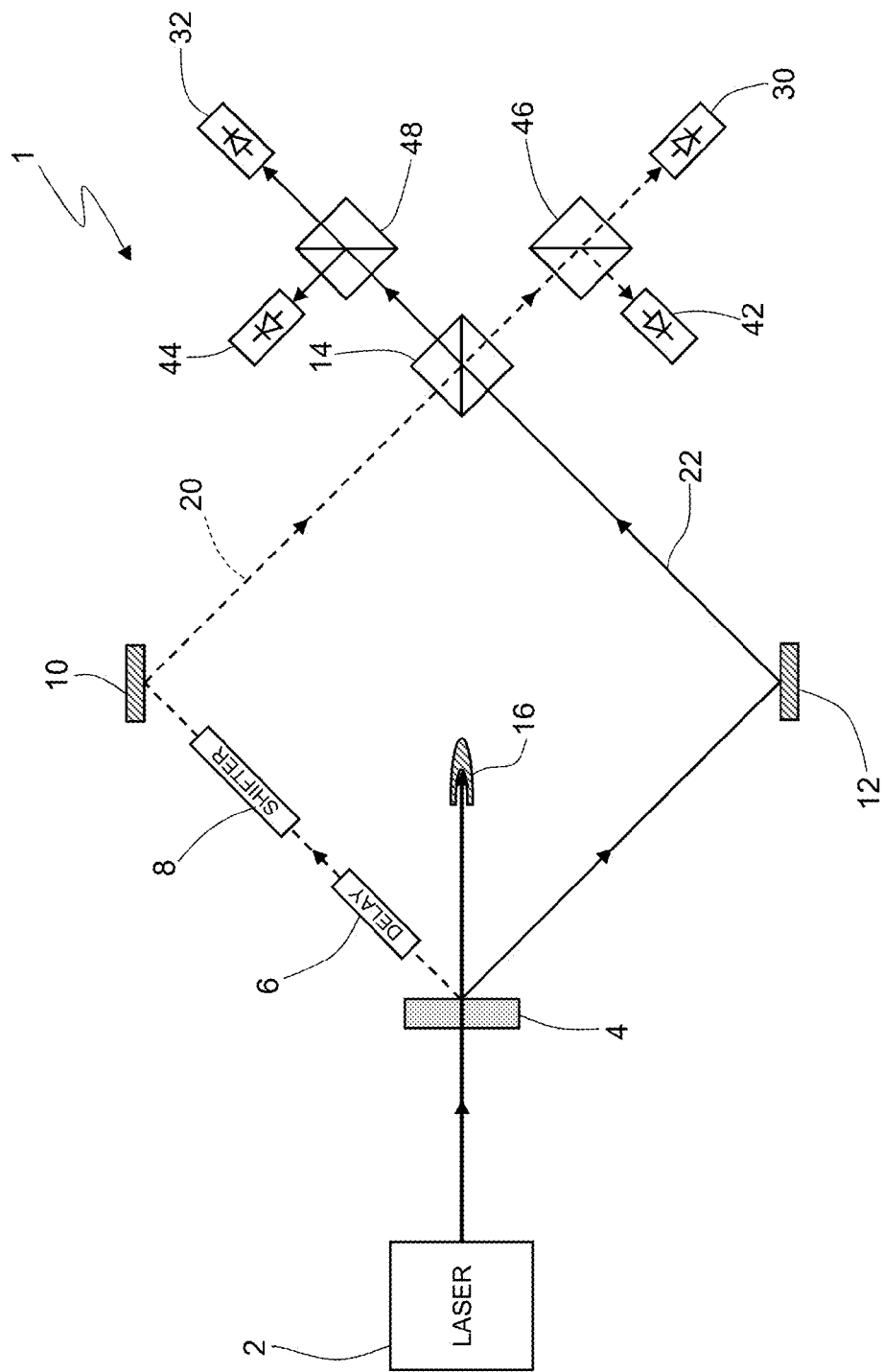
Figure 5:
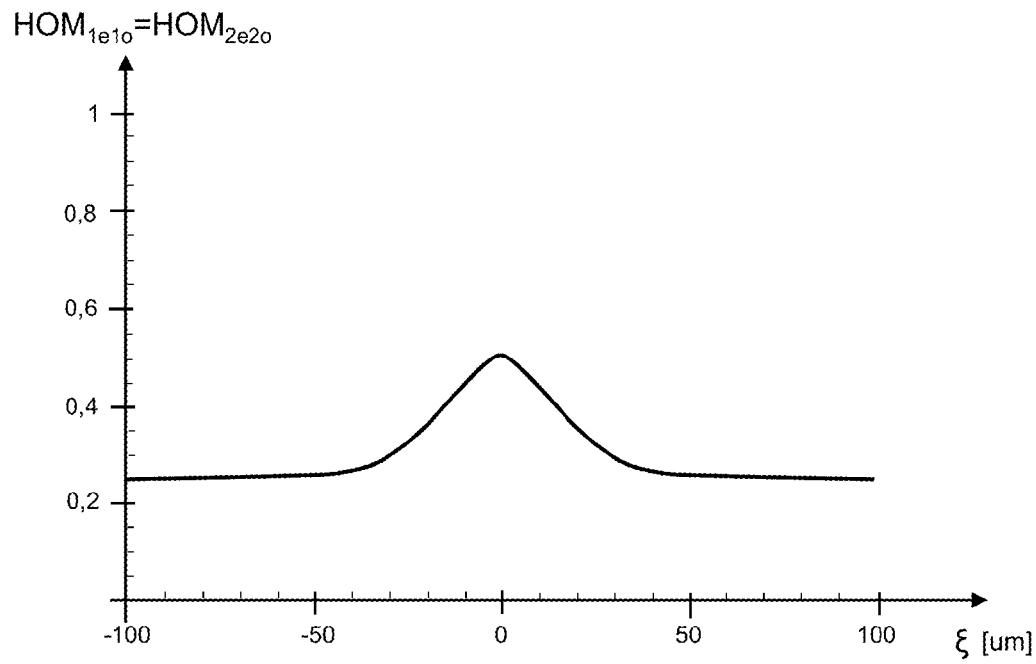
FIGS. 5 and 6 show probability density functions related to the outputs of the interferometer shown in FIGS. 1 and 4, in the cases of symmetric and antisymmetric input states, respectively.
Figure 6:
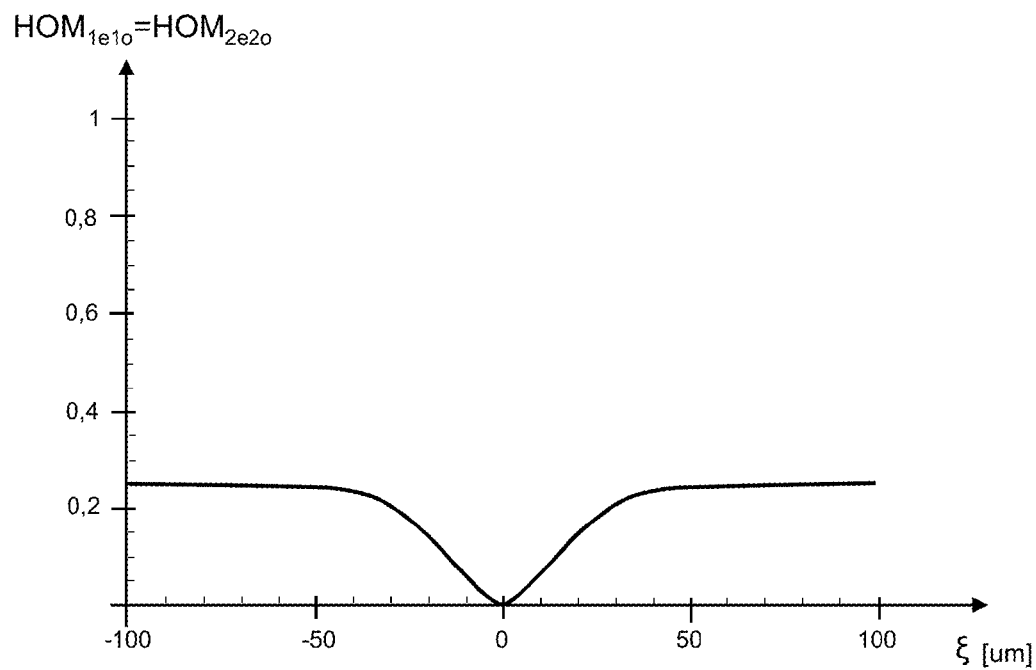
Figure 7:
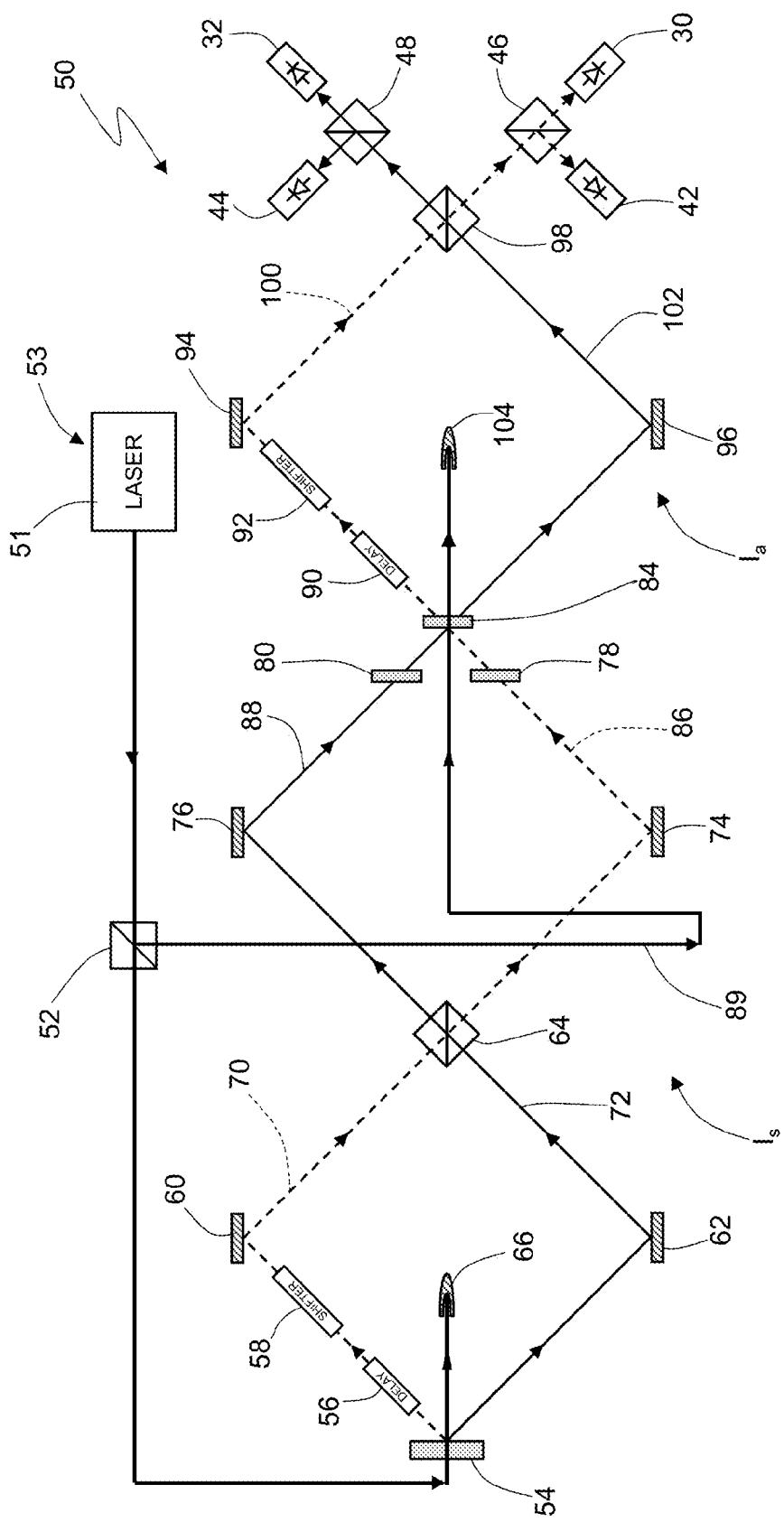
FIG. 7 shows a block diagram of a first embodiment of the interferometer according to the present invention.

FIG. 7 shows an interferometer for controlling the coalescence of a pair of photons, indicated as a whole by reference numeral 50 and which is henceforth referred to as the interferometer 50.

In detail, the interferometer 50 comprises an optical source 51 of the coherent type, such as a laser source for example, and an optical pump beam splitter 52, which together form a pump photon generator 53.

In particular, the optical source 51 is able to generate electromagnetic pulses, for example, at a wavelength of 415 nm, which are received by the optical pump beam splitter 52. In detail, the optical pump beam splitter 52 has an input, on which it receives electromagnetic pulses generated by the optical source 51, and first and second outputs.

In use, for each electromagnetic pulse that impinges on its input, the optical pump beam splitter 52 generates a corresponding pump pulse, described further on, on each of the first and second outputs.

The interferometer 50 also comprises a first crystal 54, a first delay line 56, a first polarization phase-shifter 58, first and second mirrors 60, 62 and an optical beam splitter that is referred to as the first interferometer beam splitter 64.

The first delay line 56, in itself known and which will henceforth be referred to as the first interferometer delay line 56, is of the optical type and is formed, for example, by an optical trombone. In use, when it is passed through by a photon, the first interferometer delay line 56 delays it for a predetermined and electronically controllable time.

The first polarization phase-shifter 58, also of a type in itself known, is formed, for example, by a birefringent crystal, which, when passed through by photons, phase shifts them differently according to the polarizations of the photons. Furthermore, the first polarization phase-shifter 58 can be controlled, by voltage for example, so as to vary the phase shift that it introduces.

The first crystal 54 is an optically non-linear crystal, such as, for example, a non-centrosymmetric crystal (for example, a crystal of barium borate, BBO), and is arranged so as to receive the pump pulses originating from the first output of the optical pump beam splitter 52, which will henceforth be referred to as first crystal pulses. Although not shown, the first crystal pulses can be directed to the first crystal 54 in a manner which is in itself known, for example, by opportune mirrors and/or lenses and/or waveguides.

A first beam stopper 66 (optional) is arranged in front of and aligned with the first crystal 54, having the function of absorbing the photons of the first crystal pulses that pass through the first crystal 54 without giving rise to phenomena of spontaneous parametric down-conversion, as described further on.

The first crystal 54 defines, together with the first interferometer delay line 56, the first polarization phase-shifter 58 and the first mirror 60, a first optical path 70, which connects the first crystal 54 to the first interferometer beam splitter 64 in a way such that the first interferometer delay line 56 and the first polarization phase-shifter 58 are interposed between the first crystal 54 and the first mirror 60. The first crystal 54 also defines, together with the second mirror 62, a second optical path 72, which also connects the first crystal 54 to the first interferometer beam splitter 64.

Although not shown in FIG. 7, the first and second optical paths 70, 72 are arranged, in a manner which is in itself known, along the intersections of the two emission cones along which the first crystal 54 emits, following the phenomenon of spontaneous parametric down-conversion of a photon of a first crystal pulse, the corresponding extraordinary photon and the corresponding ordinary photon. In these terms, it can be assumed that the first crystal 54 has a first and a second output, each one defined by a corresponding line between the two lines of intersection along which the above-mentioned two emission cones intersect. The first and second optical paths 70 and 72 originate respectively from the first and second outputs of the first crystal 54; for the purposes of the present invention, it is indifferent which of the first and second optical path 70, 72 derives its origin from the first output of the first crystal 54 and which one derives it from the second output. It should also be noted that, in FIG. 7, the angles formed by the first and second optical paths 70, 72 are purely qualitative.

The first interferometer beam splitter 64 is of the so-called 50/50 type and has a first and second input, and a first and second output. For example, the first interferometer beam splitter 64 can be formed by a pair of prisms.

As already mentioned, the first and second optical paths 70, 72 optically connect to the first interferometer beam splitter 64, defining precisely the first and second input, since, as already established with regard to the HOM interferometer, the term "input" means a corresponding direction of propagation of an electromagnetic signal or photon that impinges on the first interferometer beam splitter 64. The definition of the first and second inputs of the first interferometer beam splitter 64 also entails the definition of the first and second outputs of the first interferometer beam splitter 64, which imply corresponding directions of propagation of electromagnetic signals or photons that move away from the optical beam splitter.

For completeness, hereinafter reference will be made to the first output of the first interferometer beam splitter 64 to indicate the direction of propagation taken by the photons that impinge the first optical beam splitter 64 after having followed the first optical path 70 and that pass through the first interferometer beam splitter 64 without being reflected, this direction of propagation being coincident with the direction of propagation of the photons that impinge on the first optical beam splitter 64 after having followed the second optical path 72 and are reflected by it. Similarly, hereinafter reference will be made to the second output of the first interferometer beam splitter 64 to indicate the direction of propagation taken by the photons that impinge on the first interferometer beam splitter 64 after having followed the second optical path 72 and that pass through the first interferometer beam splitter 64 without being reflected, this direction of propagation being coincident with the direction of propagation of the photons that impinge on the first optical beam splitter 64 after having followed the first optical path 70 and are reflected by it.

The interferometer 50 also comprises a third and fourth mirror 74, 76, a first and second compensation element 78, 80 (described in detail further on) and a second crystal 84, the latter being an optically non-linear crystal, identical to the first crystal 54 and oriented in the same manner. For example, each one of the first and second crystals 54, 84 is parallelepipedal and is cut so that the optical axis forms an angle with the longitudinal axis of the parallelepiped, for example, equal to 42°; in addition, these parallelepipeds obviously have the same length.

In greater detail, the first and second compensation elements 78, 80 are each formed by a crystal identical to the second crystal 84, with regard to both the material and the geometrical shape; they therefore have the same length as the second crystal 84. Furthermore, each of the first and second compensation elements 78, 80 is rotated 90° with respect to the second crystal 84; in particular, each of the first and second compensation elements 78, 80 has a position (orientation) that corresponds to the position of the second crystal 84, but rotated 90° with respect to the optical axis (whether clockwise or anticlockwise is indifferent). In this way, downstream of the second crystal 84, the ordinary photon and the extraordinary photon generated by the first crystal 54 maintain the same time delay they have in output from the first crystal 54, since each one passes through two birefringent optical elements (the second crystal and, in alternative, the first or the second compensation element) having ordinary and extraordinary refractive indices exchanged between them. In practice, the first and second compensation elements 78, 80 perform the function of making the output state from the first interferometer beam splitter 64 temporally equal to the output state from second crystal 84.

The third and fourth mirrors 74, 76 are arranged to receive, respectively, the photons originating from the first and second outputs of the first interferometer beam splitter 64, and to reflect them in the direction of the second crystal 84.

In even greater detail, the first interferometer beam splitter 64, the third mirror 74, the first compensation element 78 and the second crystal 84 form a third optical path 86, which connects the first output of the first interferometer beam splitter 64 to the second crystal 84, and is such that the first compensation element 78 is interposed between the third mirror 74 and the second crystal 84. In practice, the third optical path 86 is the continuation of the first optical path 70.

Similarly, the first interferometer beam splitter 64, the fourth mirror 76, the second compensation element 80 and the second crystal 84 form a fourth optical path 88, which connects the second output of the first interferometer beam splitter 64 to the second crystal 84, and is such that the second compensation element 80 is interposed between the fourth mirror 76 and the second crystal 84. In practice, the fourth optical path 88 is the continuation of the second optical path 72.

Similarly to what happens for the first and second optical paths 70, 72, the third and fourth optical paths 86, 88 also develop along two lines of intersection of the two emission cones of the first crystal 54, which change, in a manner which is in itself known, following interaction with the components of the interferometer 50, and in particular following interaction with the first and second mirrors 60, 62, the first interferometer beam splitter 64, the third and the fourth mirrors 76, 78, and the first and second compensation elements 78, 80.

The interferometer 50 also comprises a further delay line 89, which is henceforth referred to as the pump delay line 89. This pump delay line 89 is arranged to receive the pump pulses originating from the second output of the optical pump beam splitter 52, which are henceforth referred to as second crystal pulses, each of which corresponds to a respective first crystal pulse. Moreover, the pump delay line 89 can be formed in free space, for example, by using an optical trombone, or can be of the guided type; in addition, in a manner which is in itself known, the entity of the delay introduced by the pump delay line 89, namely the time employed by the photons to pass through the pump delay line 89, is variable in an electrically controllable manner.

Independently of the constructional details, the pump delay line 89 conveys the second crystal pulses to the second crystal 84.

The interferometer 50 also comprises a further delay line 90, which is referred to as the second interferometer delay line 90, and a second polarization phase-shifter 92, as well as a fifth and sixth mirror 94, 96, and a further optical beam splitter 98, which is referred to as the second interferometer beam splitter 98. The second interferometer beam splitter 98 can be the same as the first interferometer beam splitter 64.

The second crystal 84, the second interferometer delay line 90, the second polarization phase-shifter 92, the fifth mirror 94 and the second interferometer beam splitter 98 form a fifth optical path 100, which connects the second crystal 84 to the second interferometer beam splitter 98, and is such that the second interferometer delay line 90 and the second polarization phase-shifter 92 are interposed between the second crystal 84 and the mirror 94. In practice, the fifth optical path 100 is a continuation of the third optical path 86.

Furthermore, the second crystal 84, the sixth mirror 96 and the second interferometer beam splitter 98 form a sixth optical path 102, which connects the second crystal 84 to the second interferometer beam splitter 98. In practice, the sixth optical path 102 is a continuation of the fourth optical path 88.

In even greater detail, the fifth and sixth optical paths 100, 102 optically connect to the second interferometer beam splitter 98, defining the first and second inputs, in a similar manner to what happens for the first and second optical paths 70, 72 and the first interferometer beam splitter 64.

Although not shown, the fifth and sixth optical paths 100, 102 are arranged, in a manner which is in itself known, along the intersections of the two cones along which the second crystal 84 emits, following the phenomenon of spontaneous parametric down-conversion of a photon of a second crystal pulse, the corresponding extraordinary photon and the corresponding ordinary photon, in a manner similar to what happens on the first crystal 54 and the first and second optical paths 70, 72. In addition, these intersections overlap the intersections of the two cones along which the first crystal 54 emits, following the phenomenon of spontaneous parametric down-conversion of a photon of a first crystal pulse, the corresponding extraordinary photon and the corresponding ordinary photon.

The interferometer 50 is also such that any photon originating from the third optical path 86 that impinges on the second crystal 84 propagates, after having passed through the second crystal 84, along the fifth optical path 100. In addition, the interferometer 50 is such that any photon originating from the fourth optical path 88 that impinges on the second crystal 84 propagates, after having passed through the second crystal 84, along the sixth optical path 102.

In practice, a photon originating from the third optical path 86 propagates, after having passed through the second crystal 84, along the same path followed by a photon generated by the second crystal 84 through spontaneous parametric down-conversion and propagated along the fifth optical path 100. Similarly, a photon originating from the fourth optical path 88 propagates, after having passed through the second crystal 84, along the same path followed by a photon generated by the second crystal 84 through spontaneous parametric down-conversion and propagated along the sixth optical path 102. Thus, considering photons generated by the first crystal 54 and photons generated by the second crystal 84, if the corresponding first and second crystal pulses that generated them are temporally delayed in a manner such as to compensate the different optical lengths of the optical paths covered by the photons generated by the first crystal 54 and by the photons generated by the second crystal 84, it is not possible to determine, on the basis of the optical paths followed, which crystal generated them.

For practical purposes, the first, third and fifth optical paths 70, 86, 100 are consecutive to each other and form a first extended path, while the second, fourth and sixth optical paths 72, 88, 102, also consecutive to each other, form a second extended path.

The interferometer also comprises a second beam stopper 104, arranged in front of the second crystal 84 and having the function of absorbing the photons of the second crystal pulses that pass through the second crystal 84 without giving rise to the phenomenon of spontaneous parametric down-conversion.

As described in detail in the following, coalescence control is obtained on the first and second outputs of the second interferometer beam splitter 98. To this end, in a manner which is in itself known, it is possible to monitor the first and second outputs of the second interferometer beam splitter 98, for example through the first, second, third and fourth photodetectors 30, 32, 42, 44, as well as through the first and second measurement splitters 46, 48 described in connection with the HOM interferometer 1. In particular, in the example in FIG. 7, the first and third photodetectors 30, 42 monitor the first output of the second interferometer beam splitter 98, and therefore the first extended path, while the second and fourth photodetectors 32, 44 monitor the second output of the second interferometer beam splitter 98, and therefore the second extended path. It is assumed that the fifth optical path 100 passes through the second interferometer beam splitter 98 and arrives to the first measurement splitter 46, and that the sixth optical path 102 passes through the second interferometer beam splitter 98 and arrives to the second measurement splitter 48.

Operationally, assuming a pair of first and second crystal pulses that are mutually corresponding, namely generated by the optical pump beam splitter 52 starting from the same electromagnetic pulse, and referring to them respectively as the symmetric pump pulse and the antisymmetric pump pulse, the interferometer 50 behaves in the following manner.

In detail, one of the photons of the symmetric pump pulse can generate, through spontaneous parametric down-conversion inside the first crystal 54, a first extraordinary photon and a first ordinary photon, each of which can propagate along the first or the second optical path 70, 72.

From a quantum viewpoint, the output state from the first interferometer beam splitter 64 can be expressed as:

$$|\psi\rangle = \frac{Ce^{-i\left(\frac{\Omega_p}{2}\right)\vartheta}}{2\sqrt{2}} \int_{-L}^{0} dz \int_{-\infty}^{+\infty} dv_p E_p^{(+)}(v_p) e^{iv_p\left(\Lambda z - \frac{\vartheta}{2}\right)} \int_{-\infty}^{+\infty} dv e^{-iDvz} \times \tag{10}$$

$$\left\{ \begin{bmatrix} \hat{a}_{1e}^\dagger\left(v + \frac{v_p + \Omega_p}{2}\right) \\ \hat{a}_{1o}^\dagger\left(-v + \frac{v_p + \Omega_p}{2}\right) \\ \hat{a}_{2e}^\dagger\left(v + \frac{v_p + \Omega_p}{2}\right) \\ \hat{a}_{2o}^\dagger\left(-v + \frac{v_p + \Omega_p}{2}\right) \end{bmatrix} (e^{iv\vartheta} + e^{-iv\vartheta}) + \begin{bmatrix} \hat{a}_{1e}^\dagger\left(v + \frac{v_p + \Omega_p}{2}\right) \\ \hat{a}_{2o}^\dagger\left(-v + \frac{v_p + \Omega_p}{2}\right) \\ \hat{a}_{2e}^\dagger\left(v + \frac{v_p + \Omega_p}{2}\right) \\ \hat{a}_{1o}^\dagger\left(-v + \frac{v_p + \Omega_p}{2}\right) \end{bmatrix} (e^{iv\vartheta} - e^{-iv\vartheta}) \right\} |0\rangle$$

where subscripts "1" and "2" refer to the first and second optical paths 70, 72, respectively (equivalently, to the first and second extended path), while subscripts "e" and "o" refer to the first extraordinary photon and the first ordinary photon; in addition, θ is a time that is a function of the delay introduced by the first interferometer delay line 56. In particular, θ is such that the condition θ=0 is obtained when the first and second optical paths 70, 72 have the same optical length.

Assuming that the first and second compensation elements 78, 80 and the second crystal 84 are absent, or rather assuming that the interferometer 50 is a so-called Mach-Zender interferometer, it is possible to express the output state from the second interferometer beam splitter 98 as:

$$|\psi\rangle = \frac{CLe^{-i\frac{\Omega_p}{2}(\vartheta+\varsigma)}}{4\sqrt{2}} \int_{-L}^{0} dz \int_{-\infty}^{+\infty} dv_p E_p^{(+)}(v_p) e^{iv_p[\Lambda z - \frac{\vartheta+\varsigma}{2}]} \quad (11)$$

$$\int_{-\infty}^{+\infty} dv e^{-iDLvz} \times \times \left\{ -\begin{bmatrix} \hat{a}_{1e}^\dagger\left(v+\frac{v_p+\Omega_p}{2}\right) \\ \hat{a}_{1o}^\dagger\left(-v+\frac{v_p+\Omega_p}{2}\right) + \\ \hat{a}_{2e}^\dagger\left(v+\frac{v_p+\Omega_p}{2}\right) \\ \hat{a}_{2o}^\dagger\left(-v+\frac{v_p+\Omega_p}{2}\right) \end{bmatrix} (e^{iv\vartheta}+e^{-iv\vartheta}) \begin{bmatrix} e^{i\left(\frac{v_p+\Omega_p}{2}\right)\varsigma} + \\ e^{-i\left(\frac{v_p+\Omega_p}{2}\right)\varsigma} \end{bmatrix} + \begin{bmatrix} \hat{a}_{1e}^\dagger\left(v+\frac{v_p+\Omega_p}{2}\right) \\ \hat{a}_{1o}^\dagger\left(-v+\frac{v_p+\Omega_p}{2}\right) - \\ \hat{a}_{2e}^\dagger\left(v+\frac{v_p+\Omega_p}{2}\right) \\ \hat{a}_{1o}^\dagger\left(-v+\frac{v_p+\Omega_p}{2}\right) \end{bmatrix} (e^{iv\vartheta}-e^{-iv\vartheta}) [e^{iv\varsigma}+e^{-iv\varsigma}] + \begin{bmatrix} \hat{a}_{1e}^\dagger\left(v+\frac{v_p+\Omega_p}{2}\right) \\ \hat{a}_{2o}^\dagger\left(-v+\frac{v_p+\Omega_p}{2}\right) + \\ \hat{a}_{2e}^\dagger\left(v+\frac{v_p+\Omega_p}{2}\right) \\ \hat{a}_{1o}^\dagger\left(-v+\frac{v_p+\Omega_p}{2}\right) \end{bmatrix} (e^{iv\vartheta}+e^{-iv\vartheta}) [e^{i\left(\frac{v_p+\Omega_p}{2}\right)\varsigma} - e^{-i\left(\frac{v_p+\Omega_p}{2}\right)\varsigma}] + \begin{bmatrix} \hat{a}_{1e}^\dagger\left(v+\frac{v_p+\Omega_p}{2}\right) \\ \hat{a}_{2o}^\dagger\left(-v+\frac{v_p+\Omega_p}{2}\right) - \\ \hat{a}_{2e}^\dagger\left(v+\frac{v_p+\Omega_p}{2}\right) \\ \hat{a}_{1o}^\dagger\left(-v+\frac{v_p+\Omega_p}{2}\right) \end{bmatrix} (e^{iv\vartheta}-e^{-iv\vartheta})[e^{iv\varsigma}-e^{-iv\varsigma}] \right\} |0\rangle$$

where ζ is a time that is a function of the delay introduced by the second interferometer delay line 90. In particular, the condition ζ=0 is obtained when the fifth and sixth optical paths 100, 102 have the same optical length. It should also be noted that when reference is made to the output states of the second interferometer beam splitter 98, subscripts "1" and "2" refer, strictly speaking, to the first and second extended paths.

In the case where θ=0 and ζ=0, equation (11) becomes:

$$|\psi\rangle = -\frac{CLe^{-i\frac{\Omega_p}{2}(\vartheta+\varsigma)}}{4\sqrt{2}} \int_{-L}^{0} dz \int_{-\infty}^{+\infty} dv_p E_p^{(+)}(v_p) e^{iv_p[\Lambda z - \frac{\vartheta+\varsigma}{2}]} \quad (12)$$

$$\int_{-\infty}^{+\infty} dv e^{-iDLvz} \times \times \begin{bmatrix} \hat{a}_{1e}^\dagger\left(v+\frac{v_p+\Omega_p}{2}\right) \\ \hat{a}_{1o}^\dagger\left(-v+\frac{v_p+\Omega_p}{2}\right) + \\ \hat{a}_{2e}^\dagger\left(v+\frac{v_p+\Omega_p}{2}\right) \\ \hat{a}_{2o}^\dagger\left(-v+\frac{v_p+\Omega_p}{2}\right) \end{bmatrix} |0\rangle$$

In a manner in itself known, it is also possible to determine the (normalized) probabilities 1e1o, 1e2o, 2e1o and 2e2o, henceforth respectively indicated as $MZ_{1e1o}$, $MZ_{1e2o}$, $MZ_{2e1o}$ and $MZ_{2e2o}$, which can be expressed as:

$$MZ_{1e1o}(\vartheta, \varsigma) = \frac{1}{4} \left\{ \begin{array}{l} 1 + \frac{1}{2}\cos(\Omega_p\varsigma)e^{-\frac{\sigma_p^2}{2}(\varsigma)^2} + \\ \frac{1}{4}\cos(\Omega_p\varsigma)Tri\left(\frac{\vartheta}{DL}\right)\left[\begin{array}{l} e^{-\frac{\sigma_p^2}{2}(2\frac{\Lambda\vartheta}{D}-\varsigma)^2} + \\ e^{-\frac{\sigma_p^2}{2}(2\frac{\Lambda\vartheta}{D}+\varsigma)^2} \end{array}\right] - \\ \frac{1}{4}Tri\left(\frac{\varsigma+\vartheta}{DL}\right)e^{-\frac{\sigma_p^2}{2}(2\frac{\Lambda}{D}(\varsigma+\vartheta))^2} + \\ \frac{1}{2}Tri\left(\frac{\varsigma}{DL}\right)e^{-\frac{\sigma_p^2}{2}(2\frac{\Lambda}{D}\varsigma)^2} - \\ \frac{1}{4}Tri\left(\frac{\varsigma-\vartheta}{DL}\right)e^{-\frac{\sigma_p^2}{2}(2\frac{\Lambda}{D}(\varsigma-\vartheta))^2} \end{array} \right\} \quad (13)$$

$$MZ_{2e2o}(\vartheta, \varsigma) = \frac{1}{4} \left\{ \begin{array}{l} 1 + \frac{1}{2}\cos(\Omega_p\varsigma)e^{-\frac{\sigma_p^2}{2}(\varsigma)^2} + \\ \frac{1}{4}\cos(\Omega_p\varsigma)Tri\left(\frac{\vartheta}{DL}\right)\left[\begin{array}{l} e^{-\frac{\sigma_p^2}{2}(2\frac{\Lambda\vartheta}{D}-\varsigma)^2} + \\ e^{-\frac{\sigma_p^2}{2}(2\frac{\Lambda\vartheta}{D}+\varsigma)^2} \end{array}\right] - \\ \frac{1}{4}Tri\left(\frac{\varsigma+\vartheta}{DL}\right)e^{-\frac{\sigma_p^2}{2}(2\frac{\Lambda}{D}(\varsigma+\vartheta))^2} + \\ \frac{1}{2}Tri\left(\frac{\varsigma}{DL}\right)e^{-\frac{\sigma_p^2}{2}(2\frac{\Lambda}{D}\varsigma)^2} - \\ \frac{1}{4}Tri\left(\frac{\varsigma-\vartheta}{DL}\right)e^{-\frac{\sigma_p^2}{2}(2\frac{\Lambda}{D}(\varsigma-\vartheta))^2} \end{array} \right\}$$

$$MZ_{1e2o}(\vartheta, \varsigma) = \frac{1}{4} \left\{ \begin{array}{l} 1 - \frac{1}{2}\cos(\Omega_p\varsigma)e^{-\frac{\sigma_p^2}{2}(\varsigma)^2} - \\ \frac{1}{4}\cos(\Omega_p\varsigma)Tri\left(\frac{\vartheta}{DL}\right)\left[\begin{array}{l} e^{-\frac{\sigma_p^2}{2}(2\frac{\Lambda\vartheta}{D}-\varsigma)^2} + \\ e^{-\frac{\sigma_p^2}{2}(2\frac{\Lambda\vartheta}{D}+\varsigma)^2} \end{array}\right] + \\ \frac{1}{4}Tri\left(\frac{\varsigma+\vartheta}{DL}\right)e^{-\frac{\sigma_p^2}{2}(2\frac{\Lambda}{D}(\varsigma+\vartheta))^2} - \\ \frac{1}{2}Tri\left(\frac{\varsigma}{DL}\right)e^{-\frac{\sigma_p^2}{2}(2\frac{\Lambda}{D}\varsigma)^2} + \\ \frac{1}{4}Tri\left(\frac{\varsigma-\vartheta}{DL}\right)e^{-\frac{\sigma_p^2}{2}(2\frac{\Lambda}{D}(\varsigma-\vartheta))^2} \end{array} \right\}$$

-continued $$MZ_{2e1o}(\vartheta,\varsigma) = \frac{1}{4}\begin{Bmatrix} 1 - \frac{1}{2}\text{Cos}(\Omega_p\varsigma)e^{-\frac{\sigma_p^2}{2}(\varsigma)^2} - \\ \frac{1}{4}\text{Cos}(\Omega_p\varsigma)Tri\left(\frac{\vartheta}{DL}\right)\left[\begin{array}{c}e^{-\frac{\sigma_p^2}{2}(2\frac{\Lambda\vartheta}{D}-\varsigma)^2} + \\ e^{-\frac{\sigma_p^2}{2}(2\frac{\Lambda\vartheta}{D}+\varsigma)^2}\end{array}\right] + \\ \frac{1}{4}Tri\left(\frac{\varsigma+\vartheta}{DL}\right)e^{-\frac{\sigma_p^2}{2}(2\frac{\Lambda}{D}(\varsigma+\vartheta))^2} - \\ \frac{1}{2}Tri\left(\frac{\varsigma}{DL}\right)e^{-\frac{\sigma_p^2}{2}(2\frac{\Lambda\vartheta}{D}\varsigma)^2} + \\ \frac{1}{4}Tri\left(\frac{\varsigma-\vartheta}{DL}\right)e^{-\frac{\sigma_p^2}{2}(2\frac{\Lambda}{D}(\varsigma-\vartheta))^2} \end{Bmatrix}$$

Figure 8:
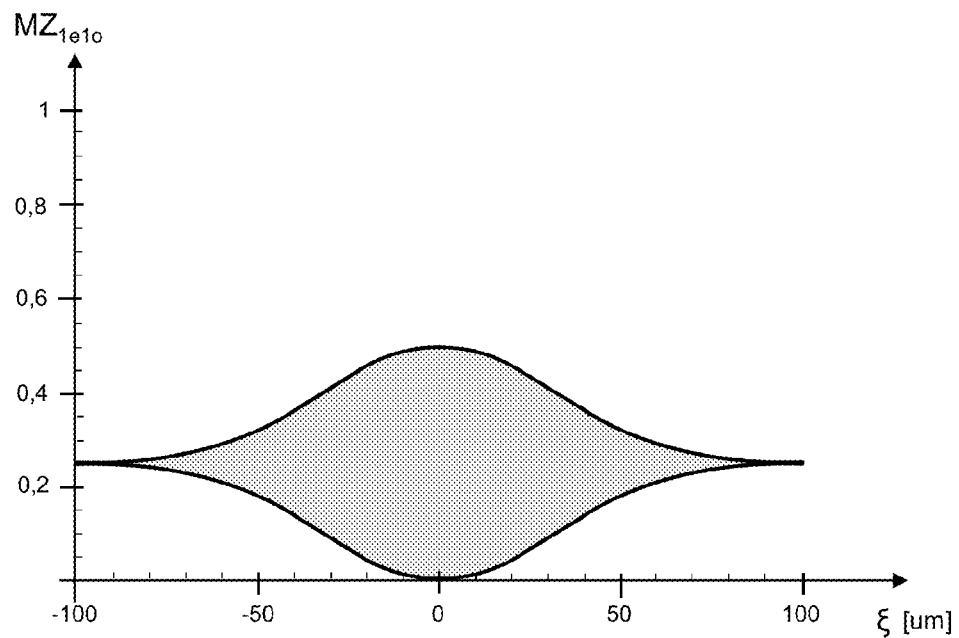
FIG. 8 shows the envelope profile of a probability density function related to the outputs of an interferometric subsystem defined by a portion of the interferometer shown in FIG. 7.

With reference to equations (13), FIG. 8 shows an envelope of probability $MZ_{1e1o}$ as a function of $\varsigma$, obtained for $\zeta=0$. Moreover, FIG. 9, also obtained for $\theta=0$, shows the probability $MZ_{1e1o}$ (equal to probability $MZ_{2e2o}$) and the probability $MZ_{1e2o}$ (equal to probability $MZ_{2e1o}$).

Figure 9:
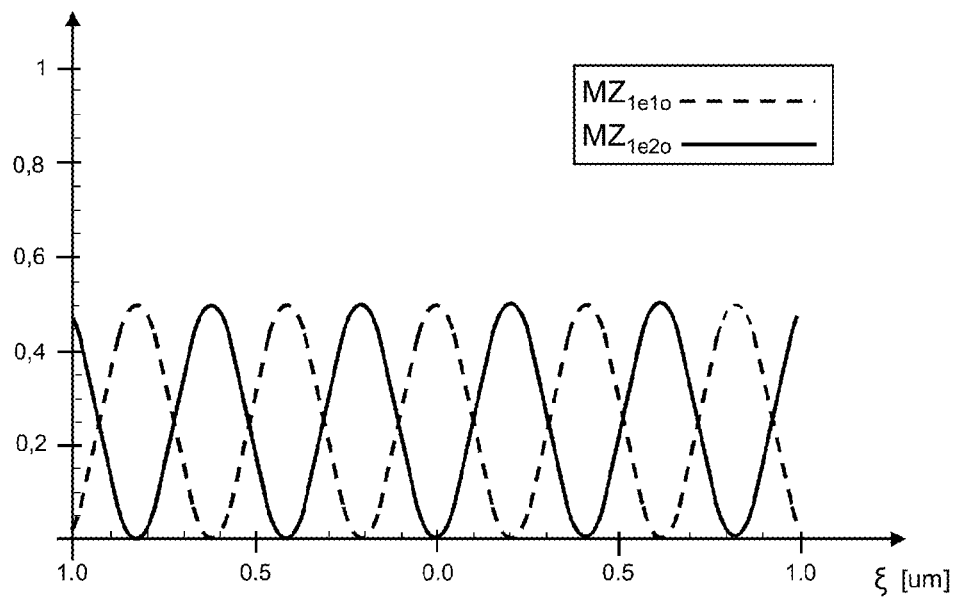
FIG. 9 shows probability density functions related to the outputs of the interferometric subsystem.

In particular, FIG. 9 shows how it is possible to change the symmetry of the output state from the second interferometer beam splitter 98 by altering $\zeta$ (within the wavelength), i.e. by altering the delay introduced by the second interferometer delay line 90. In addition, it can be noted how probability $MZ_{1e1o}$ is at its maximum and equal to 0.5 for $\zeta=0$, i.e. coalescence occurs. In other words, the first crystal 54, the first interferometer delay line 56, the first polarization phase-shifter 58, the first and second mirrors 60, 62, the first interferometer beam splitter 64, the third and fourth mirror 74, 76, the second interferometer delay line 90, the second polarization phase-shifter 92, the fifth and sixth mirrors 94, 96 and the second interferometer beam splitter 98 form a symmetric state interferential device $I_s$, the output state of which is a symmetric state with two coalescent photons, which can be expressed in a simplified manner (without considering the difference in polarization) as $1/\sqrt{2}(|2_1,0_2\rangle+|0_1,2_2\rangle)$.

Upon removing the assumption that the first and second compensation elements 78, 80 and the second crystal 84 are absent, the following occurs.

Operationally, one of the photons of the antisymmetric pump pulse can generate, through spontaneous parametric down-conversion inside the second crystal 84, a second extraordinary photon and a second ordinary photon, each of which can propagate along the fifth or the sixth optical path 100, 102, namely along the first or the second extended path. In practice, the second crystal 84, the second interferometer delay line 90, the second polarization phase-shifter 92, the fifth and sixth mirrors 94, 96 and the second interferometer beam splitter 98 form an antisymmetric state interferential device $I_a$, in a certain sense "cascaded to" the symmetric state interferential device $I_s$. More precisely, the antisymmetric state interferential device $I_a$ shares outputs with the symmetric state interferential device $I_s$, namely the second interferometer beam splitter 98, as well as the second interferometer delay line 90 and the second polarization phase-shifter 92. Furthermore, the antisymmetric state interferential device $I_a$ is a Hong-Ou-Mandel interferometer and as such provides, on its own, an antisymmetric state with two coalescent photons, which can be expressed in a simplified manner as $1/\sqrt{2}(|2_1, 0_2\rangle - |0_1, 2_2\rangle)$.

In greater detail, indicating with $\tau$ a time that is a function of the delay introduced by delay line 89, namely the delay with which the antisymmetric pump pulse impinges on the second crystal 84 with respect to the time at which the symmetric pump pulse impinges on the first crystal 54, the output state from the second interferometer beam splitter 98 becomes:

$$|\psi\rangle = \frac{e^{-i2(K_eL+K_oL_c)}CLe^{i\frac{\Omega_p}{2}(2\tau-\vartheta-\varsigma)}}{8} \quad (14)$$

$$\int_{-L}^{0}dz\int_{-\infty}^{+\infty}d\nu_p E_p^{(+)}(\nu_p)e^{i\nu_p\left[\Lambda z-\frac{G(L+L_c)+\vartheta+\varsigma-2\tau}{2}\right]}$$

$$\int_{-\infty}^{+\infty}d\nu e^{-iD\nu\left(z+\frac{L-L_c}{D}\right)} \times \times$$

$$\left\{-\begin{bmatrix}\hat{a}_{1e}^\dagger\left(\nu+\frac{\nu_p+\Omega_p}{2}\right)\\ \hat{a}_{1o}^\dagger\left(-\nu+\frac{\nu_p+\Omega_p}{2}\right)+\\ \hat{a}_{2e}^\dagger\left(\nu+\frac{\nu_p+\Omega_p}{2}\right)\\ \hat{a}_{2o}^\dagger\left(-\nu+\frac{\nu_p+\Omega_p}{2}\right)\end{bmatrix}\right.$$

$$(e^{i\nu\vartheta}+e^{-i\nu\vartheta})\begin{bmatrix}e^{i\left(\frac{\nu_p+\Omega_p}{2}\right)\varsigma}+\\ e^{-i\left(\frac{\nu_p+\Omega_p}{2}\right)\varsigma}\end{bmatrix}+$$

$$\begin{bmatrix}\hat{a}_{1e}^\dagger\left(\nu+\frac{\nu_p+\Omega_p}{2}\right)\\ \hat{a}_{1o}^\dagger\left(-\nu+\frac{\nu_p+\Omega_p}{2}\right)-\\ \hat{a}_{2e}^\dagger\left(\nu+\frac{\nu_p+\Omega_p}{2}\right)\\ \hat{a}_{2o}^\dagger\left(-\nu+\frac{\nu_p+\Omega_p}{2}\right)\end{bmatrix}$$

$$(e^{i\nu\vartheta}-e^{-i\nu\vartheta})[e^{i\nu\vartheta}+e^{-i\nu\varsigma}]+$$

$$\begin{bmatrix}\hat{a}_{1e}^\dagger\left(\nu+\frac{\nu_p+\Omega_p}{2}\right)\\ \hat{a}_{2o}^\dagger\left(-\nu+\frac{\nu_p+\Omega_p}{2}\right)+\\ \hat{a}_{2e}^\dagger\left(\nu+\frac{\nu_p+\Omega_p}{2}\right)\\ \hat{a}_{1o}^\dagger\left(-\nu+\frac{\nu_p+\Omega_p}{2}\right)\end{bmatrix}$$

$$(e^{i\nu\vartheta}+e^{-i\nu\vartheta})\begin{bmatrix}e^{i\left(\frac{\nu_p+\Omega_p}{2}\right)\varsigma}-\\ e^{-i\left(\frac{\nu_p+\Omega_p}{2}\right)\varsigma}\end{bmatrix}+$$

$$\begin{bmatrix}\hat{a}_{1e}^\dagger\left(\nu+\frac{\nu_p+\Omega_p}{2}\right)\\ \hat{a}_{2o}^\dagger\left(-\nu+\frac{\nu_p+\Omega_p}{2}\right)-\\ \hat{a}_{2e}^\dagger\left(\nu+\frac{\nu_p+\Omega_p}{2}\right)\\ \hat{a}_{1o}^\dagger\left(-\nu+\frac{\nu_p+\Omega_p}{2}\right)\end{bmatrix}$$

$$\left.(e^{i\nu\vartheta}-e^{-i\nu\vartheta})[e^{i\nu\varsigma}-e^{-i\nu\varsigma}]\right\}+$$

$$\frac{Ce^{-i\left(\frac{\Omega_p}{2}\right)\varsigma}}{4}\int_{-L}^{0}dz\int_{-\infty}^{+\infty}d\nu_p E_p^{(+)}(\nu_p)e^{i\nu_p\left(\Lambda z-\frac{\varsigma}{2}\right)}$$

$$\int_{-\infty}^{+\infty} d\nu e^{-iD\nu z} \times \left\{ \begin{bmatrix} \hat{a}_{1e}^\dagger\left(\nu + \frac{\nu_p + \Omega_p}{2}\right) \\ \hat{a}_{1o}^\dagger\left(-\nu + \frac{\nu_p + \Omega_p}{2}\right) - \\ \hat{a}_{2e}^\dagger\left(\nu + \frac{\nu_p + \Omega_p}{2}\right) \\ \hat{a}_{2o}^\dagger\left(-\nu + \frac{\nu_p + \Omega_p}{2}\right) \end{bmatrix} \\ (e^{i\nu\zeta} + e^{-i\nu\zeta}) + \\ \begin{bmatrix} \hat{a}_{1e}^\dagger\left(\nu + \frac{\nu_p + \Omega_p}{2}\right) \\ \hat{a}_{2o}^\dagger\left(-\nu + \frac{\nu_p + \Omega_p}{2}\right) - \\ \hat{a}_{2e}^\dagger\left(\nu + \frac{\nu_p + \Omega_p}{2}\right) \\ \hat{a}_{1o}^\dagger\left(-\nu + \frac{\nu_p + \Omega_p}{2}\right) \end{bmatrix} \\ (e^{i\nu\zeta} - e^{-i\nu\zeta}) \end{array} \right\} |0\rangle$$

where, indicating the extraordinary and ordinary refractive indices of the first crystal 54 as $n_e$ and $n_o$, gives $$K_e = \frac{n_e \Omega_p}{2c}, \; K_o = \frac{n_o \Omega_p}{2c}, \; G = \left(\frac{1}{u_e} + \frac{1}{u_o}\right),$$

and $L_c$ is the length of the first and second compensation elements 78, 80.

It is also possible to determine the (normalized) probabilities 1e1o, 1e2o, 2e1o and 2e2o, henceforth respectively indicated as $P_{1e1o}$, $P_{1e2o}$, $P_{2e1o}$ and $P_{2e2o}$, which can be expressed as:

$$P_{iejo}(\varsigma) = \frac{2HOM_{iejo}(\varsigma) + 2MZ_{iejo}(\vartheta,\varsigma) - I_{iejo}(\tau,\vartheta,\varsigma)}{\sum_{i,j}[2HOM_{iejo}(\varsigma) + 2MZ_{iejo}(\vartheta,\varsigma) - I_{iejo}(\tau,\vartheta,\varsigma)]} \quad (15)$$

where the indices i and j can assume values of "1" or "2", and where the following hold:

$$I_{1e1o}(\tau,\vartheta,\varsigma) = \cos\left[\Omega_p\left(\frac{2\tau-\vartheta-\varsigma}{2}\right) - 2L(K_e + K_o)\right] \quad (16)$$

$$\left\{ Tri\left(\frac{\vartheta+\varsigma}{2DL}\right)\left[ e^{-\frac{\sigma_p^2}{2}\left[\frac{\Lambda}{D}(\vartheta+\varsigma)-\frac{2GL+\vartheta+\varsigma+2\tau}{2}\right]^2} + e^{-\frac{\sigma_p^2}{2}\left[\frac{\Lambda}{D}(\vartheta+\varsigma)+\frac{2GL+\vartheta+\varsigma-2\tau}{2}\right]^2} \right] + Tri\left(\frac{\vartheta-\varsigma}{2DL}\right)\left[ e^{-\frac{\sigma_p^2}{2}\left[\frac{\Lambda}{D}(\vartheta+\varsigma)-\frac{2GL+\vartheta-\varsigma-2\tau}{2}\right]^2} + e^{-\frac{\sigma_p^2}{2}\left[\frac{\Lambda}{D}(\vartheta-\varsigma)+\frac{2GL+\vartheta+\varsigma-2\tau}{2}\right]^2} \right] \right\} +$$

$$\cos\left[\Omega_p\left(\frac{2\tau-\vartheta+\varsigma}{2}\right) - 2L(K_e + K_o)\right]$$

$$\left\{ Tri\left(\frac{\vartheta+\varsigma}{2DL}\right)\left[ e^{-\frac{\sigma_p^2}{2}\left[\frac{\Lambda}{D}(\vartheta+\varsigma)-\frac{2GL+\vartheta+\varsigma-2\tau}{2}\right]^2} + e^{-\frac{\sigma_p^2}{2}\left[\frac{\Lambda}{D}(\vartheta+\varsigma)+\frac{2GL+\vartheta-\varsigma-2\tau}{2}\right]^2} \right] + Tri\left(\frac{\vartheta-\varsigma}{2DL}\right)\left[ e^{-\frac{\sigma_p^2}{2}\left[\frac{\Lambda}{D}(\vartheta-\varsigma)-\frac{2GL+\vartheta-\varsigma-2\tau}{2}\right]^2} + e^{-\frac{\sigma_p^2}{2}\left[\frac{\Lambda}{D}(\vartheta-\varsigma)+\frac{2GL+\vartheta-\varsigma-2\tau}{2}\right]^2} \right] \right\} +$$

$$\cos\left[\Omega_p\left(\frac{2\tau-\vartheta}{2}\right) - 2L(K_e + K_o)\right]$$

$$\left\{ 2Tri\left(\frac{\vartheta}{2DL}\right)\left[ e^{-\frac{\sigma_p^2}{2}\left[\frac{\Lambda}{D}(\vartheta)+\frac{2GL+\vartheta-2\tau}{2}\right]^2} - e^{-\frac{\sigma_p^2}{2}\left[\frac{\Lambda}{D}(\vartheta)-\frac{2GL+\vartheta-2\tau}{2}\right]^2} \right] + Tri\left(\frac{\vartheta-\varsigma}{2DL}\right)\left[ e^{-\frac{\sigma_p^2}{2}\left[\frac{\Lambda}{D}(\vartheta-\varsigma)+\frac{2GL+\vartheta-2\tau}{2}\right]^2} - e^{-\frac{\sigma_p^2}{2}\left[\frac{\Lambda}{D}(\vartheta-\varsigma)-\frac{2GL+\vartheta-2\tau}{2}\right]^2} \right] + Tri\left(\frac{\vartheta+\varsigma}{2DL}\right)\left[ e^{-\frac{\sigma_p^2}{2}\left[\frac{\Lambda}{D}(\vartheta+\varsigma)+\frac{2GL+\vartheta-2\tau}{2}\right]^2} - e^{-\frac{\sigma_p^2}{2}\left[\frac{\Lambda}{D}(\vartheta+\varsigma)-\frac{2GL+\vartheta-2\tau}{2}\right]^2} \right] \right\}$$

$$I_{2e1o}(\tau,\vartheta,\varsigma) = -\cos\left[\Omega_p\left(\frac{2\tau-\vartheta-\varsigma}{2}\right) - 2L(K_e + K_o)\right]$$

$$\left\{ Tri\left(\frac{\vartheta+\varsigma}{2DL}\right)\left[ e^{-\frac{\sigma_p^2}{2}\left[\frac{\Lambda}{D}(\vartheta+\varsigma)-\frac{2GL+\vartheta+\varsigma-2\tau}{2}\right]^2} + e^{-\frac{\sigma_p^2}{2}\left[\frac{\Lambda}{D}(\vartheta+\varsigma)+\frac{2GL+\vartheta+\varsigma-2\tau}{2}\right]^2} \right] - Tri\left(\frac{\vartheta-\varsigma}{2DL}\right)\left[ e^{-\frac{\sigma_p^2}{2}\left[\frac{\Lambda}{D}(\vartheta-\varsigma)-\frac{2GL+\vartheta+\varsigma-2\tau}{2}\right]^2} + e^{-\frac{\sigma_p^2}{2}\left[\frac{\Lambda}{D}(\vartheta-\varsigma)+\frac{2GL+\vartheta+\varsigma-2\tau}{2}\right]^2} \right] \right\} -$$

$$\cos\left[\Omega_p\left(\frac{2\tau-\vartheta+\varsigma}{2}\right) - 2L(K_e + K_o)\right]$$

$$\left\{ Tri\left(\frac{\vartheta+\varsigma}{2DL}\right)\left[ e^{-\frac{\sigma_p^2}{2}\left[\frac{\Lambda}{D}(\vartheta+\varsigma)-\frac{2GL+\vartheta-\varsigma-2\tau}{2}\right]^2} + e^{-\frac{\sigma_p^2}{2}\left[\frac{\Lambda}{D}(\vartheta+\varsigma)+\frac{2GL+\vartheta-\varsigma-2\tau}{2}\right]^2} \right] + Tri\left(\frac{\vartheta-\varsigma}{2DL}\right)\left[ e^{-\frac{\sigma_p^2}{2}\left[\frac{\Lambda}{D}(\vartheta-\varsigma)-\frac{2GL+\vartheta-\varsigma-2\tau}{2}\right]^2} + e^{-\frac{\sigma_p^2}{2}\left[\frac{\Lambda}{D}(\vartheta-\varsigma)+\frac{2GL+\vartheta-\varsigma-2\tau}{2}\right]^2} \right] \right\} +$$

$$\cos\left[\Omega_p\left(\frac{2\tau-\vartheta}{2}\right) - 2L(K_e + K_o)\right]$$

-continued $$\left\{ 2Tri\left(\frac{\vartheta}{2DL}\right)\left[ e^{-\frac{\sigma_P^2}{2}\left[\frac{\Lambda}{D}(\vartheta)+\frac{2GL+\vartheta-2\tau}{2}\right]^2} - e^{-\frac{\sigma_P^2}{2}\left[\frac{\Lambda}{D}(\vartheta)-\frac{2GL+\vartheta-2\tau}{2}\right]^2} \right] + \right.$$
$$Tri\left(\frac{\vartheta-\varsigma}{2DL}\right)\left[ e^{-\frac{\sigma_P^2}{2}\left[\frac{\Lambda}{D}(\vartheta-\varsigma)+\frac{2GL+\vartheta-\varsigma-2\tau}{2}\right]^2} - e^{-\frac{\sigma_P^2}{2}\left[\frac{\Lambda}{D}(\vartheta-\varsigma)-\frac{2GL+\vartheta-\varsigma-2\tau}{2}\right]^2} \right] +$$
$$\left. Tri\left(\frac{\vartheta+\varsigma}{2DL}\right)\left[ e^{-\frac{\sigma_P^2}{2}\left[\frac{\Lambda}{D}(\vartheta+\varsigma)+\frac{2GL+\vartheta-2\tau}{2}\right]^2} - e^{-\frac{\sigma_P^2}{2}\left[\frac{\Lambda}{D}(\vartheta+\varsigma)-\frac{2GL+\vartheta-2\tau}{2}\right]^2} \right] \right\}$$

$$I_{1e2o}(\tau, \vartheta, \varsigma) = \text{Cos}\left[\Omega_p\left(\frac{2\tau-\vartheta-\varsigma}{2}\right) - 2L(K_e + K_o)\right]$$

$$\left\{ Tri\left(\frac{\vartheta+\varsigma}{2DL}\right)\left[ e^{-\frac{\sigma_P^2}{2}\left[\frac{\Lambda}{D}(\vartheta+\varsigma)-\frac{2GL+\vartheta+\varsigma-2\tau}{2}\right]^2} - e^{-\frac{\sigma_P^2}{2}\left[\frac{\Lambda}{D}(\vartheta+\varsigma)+\frac{2GL+\vartheta+\varsigma-2\tau}{2}\right]^2} \right] - \right.$$
$$\left. Tri\left(\frac{\vartheta-\varsigma}{2DL}\right)\left[ e^{-\frac{\sigma_P^2}{2}\left[\frac{\Lambda}{D}(\vartheta+\varsigma)-\frac{2GL+\vartheta+\varsigma-2\tau}{2}\right]^2} - e^{-\frac{\sigma_P^2}{2}\left[\frac{\Lambda}{D}(\vartheta+\varsigma)+\frac{2GL+\vartheta+\varsigma-2\tau}{2}\right]^2} \right] \right\}$$

$$\text{Cos}\left[\Omega_p\left(\frac{2\tau-\vartheta+\varsigma}{2}\right) - 2L(K_e + K_o)\right]$$

$$\left\{ Tri\left(\frac{\vartheta+\varsigma}{2DL}\right)\left[ e^{-\frac{\sigma_P^2}{2}\left[\frac{\Lambda}{D}(\vartheta+\varsigma)+\frac{2GL+\vartheta-\varsigma-2\tau}{2}\right]^2} - e^{-\frac{\sigma_P^2}{2}\left[\frac{\Lambda}{D}(\vartheta+\varsigma)-\frac{2GL+\vartheta-\varsigma-2\tau}{2}\right]^2} \right] - \right.$$
$$\left. Tri\left(\frac{\vartheta-\varsigma}{2DL}\right)\left[ e^{-\frac{\sigma_P^2}{2}\left[\frac{\Lambda}{D}(\vartheta-\varsigma)+\frac{2GL+\vartheta-\varsigma-2\tau}{2}\right]^2} - e^{-\frac{\sigma_P^2}{2}\left[\frac{\Lambda}{D}(\vartheta-\varsigma)-\frac{2GL+\vartheta-\varsigma-2\tau}{2}\right]^2} \right] \right\}$$

$$\text{Cos}\left[\Omega_p\left(\frac{2\tau-\vartheta}{2}\right) - 2L(K_e + K_o)\right]$$

$$\left\{ 2Tri\left(\frac{\vartheta}{2DL}\right)\left[ e^{-\frac{\sigma_P^2}{2}\left[\frac{\Lambda}{D}(\vartheta)+\frac{2GL-\vartheta-2\tau}{2}\right]^2} - e^{-\frac{\sigma_P^2}{2}\left[\frac{\Lambda}{D}(\vartheta)+\frac{2GL+\vartheta-2\tau}{2}\right]^2} \right] - \right.$$
$$Tri\left(\frac{\vartheta-\varsigma}{2DL}\right)\left[ e^{-\frac{\sigma_P^2}{2}\left[\frac{\Lambda}{D}(\vartheta-\varsigma)-\frac{2GL-\vartheta-2\tau}{2}\right]^2} - e^{-\frac{\sigma_P^2}{2}\left[\frac{\Lambda}{D}(\vartheta-\varsigma)+\frac{2GL-\vartheta-2\tau}{2}\right]^2} \right] -$$
$$\left. Tri\left(\frac{\vartheta+\varsigma}{2DL}\right)\left[ e^{-\frac{\sigma_P^2}{2}\left[\frac{\Lambda}{D}(\vartheta+\varsigma)+\frac{2GL+\vartheta-2\tau}{2}\right]^2} - e^{-\frac{\sigma_P^2}{2}\left[\frac{\Lambda}{D}(\vartheta+\varsigma)-\frac{2GL+\vartheta-2\tau}{2}\right]^2} \right] \right\}$$

$$I_{2e2o}(\tau, \vartheta, \varsigma) = -\text{Cos}\left[\Omega_p\left(\frac{2\tau-\vartheta-\varsigma}{2}\right) - 2L(K_e + K_o)\right]$$

$$\left\{ +Tri\left(\frac{\vartheta+\varsigma}{2DL}\right)\left[ e^{-\sigma_P^2\left[\frac{\Lambda}{D}(\vartheta+\varsigma)+\frac{2GL+\vartheta+\varsigma-2\tau}{2}\right]^2} - e^{-\frac{\sigma_P^2}{2}\left[\frac{\Lambda}{D}(\vartheta+\varsigma)-\frac{2GL+\vartheta+\varsigma-2\tau}{2}\right]^2} \right] + \right.$$
$$\left. Tri\left(\frac{\vartheta-\varsigma}{2DL}\right)\left[ e^{-\sigma_P^2\left[\frac{\Lambda}{D}(\vartheta-\varsigma)-\frac{2GL+\vartheta+\varsigma-2\tau}{2}\right]^2} - e^{-\frac{\sigma_P^2}{2}\left[\frac{\Lambda}{D}(\vartheta-\varsigma)+\frac{2GL+\vartheta+\varsigma-2\tau}{2}\right]^2} \right] \right\} +$$

$$\text{Cos}\left[\Omega_p\left(\frac{2\tau-\vartheta+\varsigma}{2}\right) - 2L(K_e + K_o)\right]$$

$$\left\{ +Tri\left(\frac{\vartheta+\varsigma}{2DL}\right)\left[ e^{-\frac{\sigma_P^2}{2}\left[\frac{\Lambda}{D}(\vartheta+\varsigma)+\frac{2GL+\vartheta-\varsigma-2\tau}{2}\right]^2} - e^{-\frac{\sigma_P^2}{2}\left[\frac{\Lambda}{D}(\vartheta+\varsigma)-\frac{2GL+\vartheta-\varsigma-2\tau}{2}\right]^2} \right] + \right.$$
$$\left. Tri\left(\frac{\vartheta-\varsigma}{2DL}\right)\left[ e^{-\frac{\sigma_P^2}{2}\left[\frac{\Lambda}{D}(\vartheta-\varsigma)-\frac{2GL+\vartheta-\varsigma-2\tau}{2}\right]^2} - e^{-\frac{\sigma_P^2}{2}\left[\frac{\Lambda}{D}(\vartheta-\varsigma)+\frac{2GL+\vartheta-\varsigma-2\tau}{2}\right]^2} \right] \right\} -$$

$$\text{Cos}\left[\Omega_p\left(\frac{2\tau-\vartheta}{2}\right) - 2L(K_e + K_o)\right]$$

$$\left\{ 2Tri\left(\frac{\vartheta}{2DL}\right)\left[ e^{-\frac{\sigma_P^2}{2}\left[\frac{\Lambda}{D}(\vartheta)+\frac{2GL+\vartheta-2\tau}{2}\right]^2} - e^{-\frac{\sigma_P^2}{2}\left[\frac{\Lambda}{D}(\vartheta)-\frac{2GL+\vartheta-2\tau}{2}\right]^2} \right] - \right.$$
$$Tri\left(\frac{\vartheta-\varsigma}{2DL}\right)\left[ e^{-\frac{\sigma_P^2}{2}\left[\frac{\Lambda}{D}(\vartheta-\varsigma)+\frac{2GL+\vartheta-2\tau}{2}\right]^2} - e^{-\frac{\sigma_P^2}{2}\left[\frac{\Lambda}{D}(\vartheta-\varsigma)-\frac{2GL+\vartheta-2\tau}{2}\right]^2} \right] -$$
$$\left. Tri\left(\frac{\vartheta+\varsigma}{2DL}\right)\left[ e^{-\frac{\sigma_P^2}{2}\left[\frac{\Lambda}{D}(\vartheta+\varsigma)+\frac{2GL+\vartheta-2\tau}{2}\right]^2} - e^{-\frac{\sigma_P^2}{2}\left[\frac{\Lambda}{D}(\vartheta+\varsigma)-\frac{2GL+\vartheta-2\tau}{2}\right]^2} \right] \right\}$$

Figure 10:
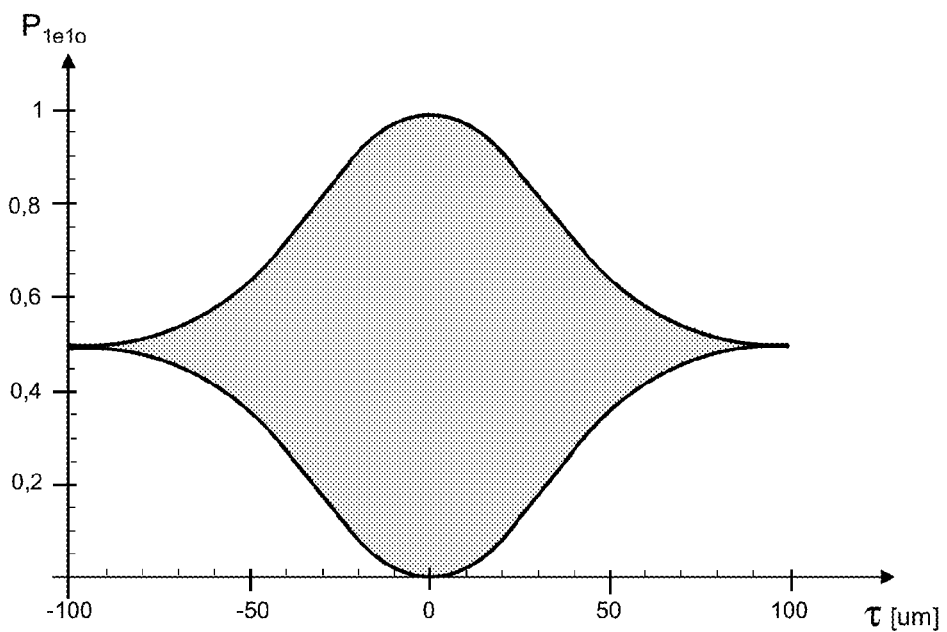
FIG. 10 shows the envelope profile of a probability density function related to the outputs of the interferometer shown in FIG. 7.

With reference to equation (15), FIG. 10 shows an envelope of probability $P_{1e1o}$ as a function of $\tau$, obtained for $\theta=0$ and $\zeta=0$.

Figure 11:
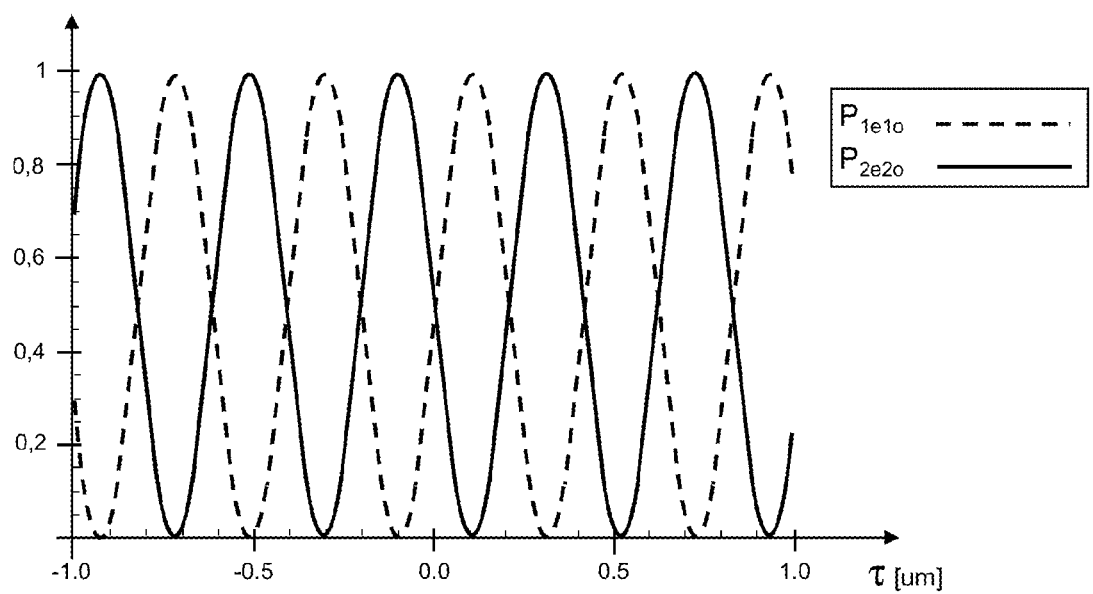
FIG. 11 shows probability density functions related to the outputs of the interferometer shown in FIG. 7.

Moreover, FIG. 11, also obtained for $\theta=0$ and $\zeta=0$, shows, as a function of $\tau$, the probability $P_{1e1o}$, namely the probability of having an extraordinary photon—ordinary photon pair on the first output of the second interferometer beam splitter 98, and the probability $P_{2e2o}$, namely the probability of having an extraordinary photon—ordinary photon pair on the second output of the second interferometer beam splitter 98.

In detail, both probability $P_{1e1o}$ and probability $P_{2e2o}$ have an oscillating trend and are in the range between 0 and 1. In particular, for $\zeta=0$ and $\theta=0$, the output state from the second interferometer beam splitter 98 can be expressed as:

$$1/\sqrt{2}(|2_1,0_2\rangle+|0_1,2_2\rangle)+e^{i\tau}\cdot 1/\sqrt{2}(|2_1,0_2\rangle-|0_1,2_2\rangle) \quad (17)$$

i.e. the weighted sum of a symmetric state with two coalescent photons and an antisymmetric state with two coalescent photons. The weight of the symmetric state with two coalescent photons is unitary, while the weight of the antisymmetric state with two coalescent photons is a function of $\tau$, i.e. it depends on the delay introduced by the pump delay line 89.

It should be noted that in order to pump the first and second crystals 54, 84 in a coherent manner, the pump delay line 89 is sized such that $\tau$ does not exceed the characteristic coherence time of the electromagnetic pulses emitted by the optical source 52; in this way, the pulses of each pair of first and second crystal pulses are mutually coherent. In addition, $\tau$ is chosen so that the value τ=0 corresponds to the case where the first extraordinary photon and the first ordinary photon possibly generated by the first crystal 54 impinge on the second crystal 84 simultaneously with the antisymmetric pump pulse.

Since the delay introduced by the pump delay line 89 is electronically controllable, in a manner which is in itself known, it is therefore possible to control the output state from the interferometer 50.

In other words, by altering the temporal phase shift between the symmetric pump pulse and the antisymmetric pump pulse, it is possible to control the probabilities with which the pair of coalescent photons appear on the first or on the second output of the second interferometer beam splitter 98.

It may also be noted that the description provided for the embodiment shown in FIG. 7 can be extended in the case where phenomena of type-I spontaneous parametric down-conversion occur inside the first and second crystals 54, 84, i.e. phenomena where the generated photons have the same polarization. In this case, the first and second measurement splitters 46, 48 are replaced by corresponding substitutive optical beam splitters, of the 50/50 type, while the first and second compensation elements 78, 80 are absent; in addition, two narrow-band interference filters, centred on the wavelength of the photons emitted through spontaneous parametric down-conversion, are interposed between the second interferometer beam splitter 98 and the substitutive optical beam splitters.

Figure 12:
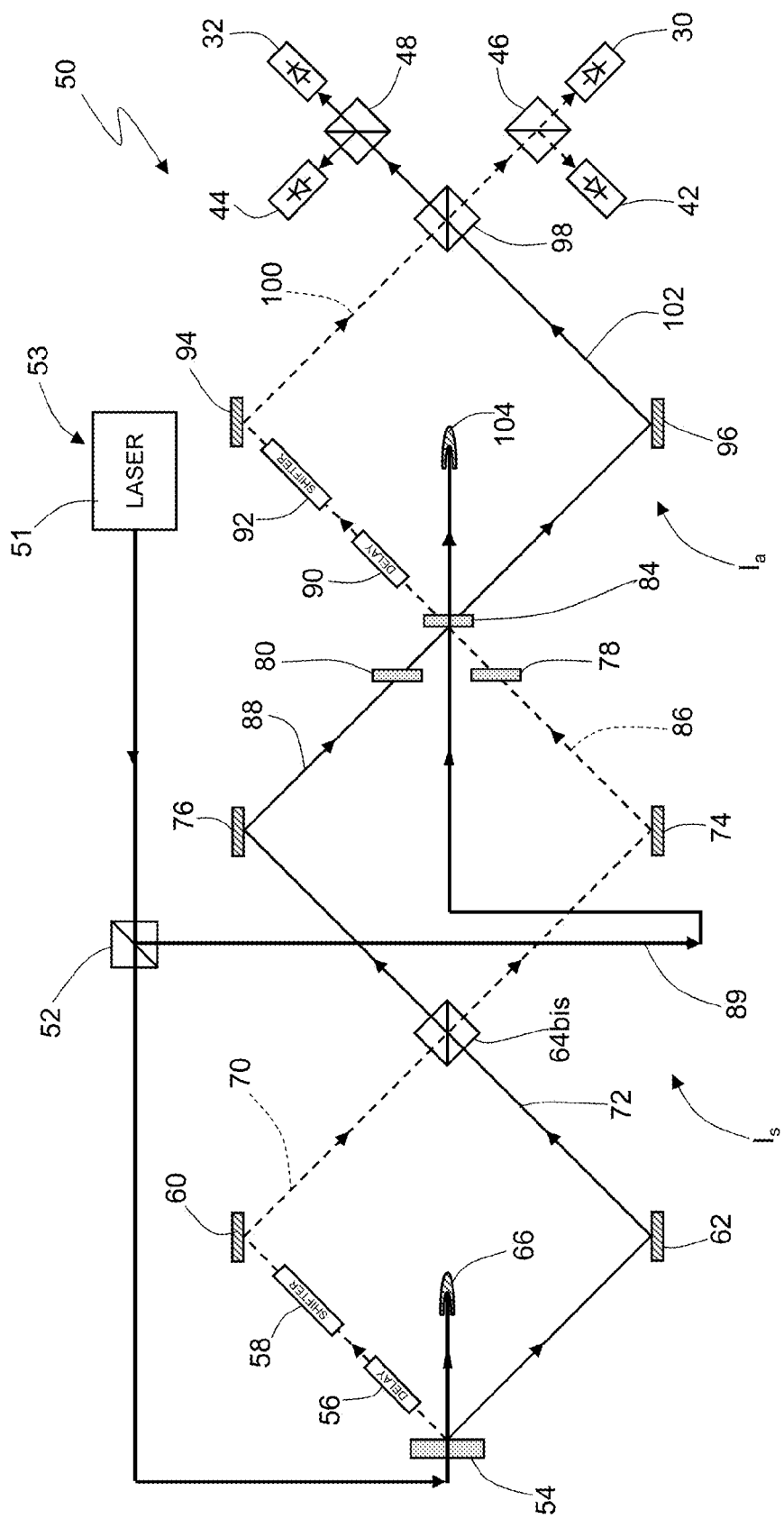
FIG. 12 shows a block diagram of a second embodiment of the interferometer according to the present invention.

According to a different embodiment, still regarding the case of type-II spontaneous parametric down-conversion, it is also possible to replace the first interferometer beam splitter 64 with a substitutive optical beam splitter 64b is of the polarizing type, as shown in FIG. 12. Instead, the second interferometer beam splitter 98 continues to be of the 50/50 type.

In this case, the output state of the second interferometer beam splitter 98 becomes:

$$|\psi\rangle = \frac{iCe^{-i\left(\frac{\Omega_p}{2}(2\tau - \vartheta - \varsigma)2L(K_e + K_e)\right)}}{4} \quad (18)$$

$$\int_{-L}^{0} dz \int_{0}^{+\infty} d\nu_p E_p^{(+)}(\nu_p) e^{i\nu_p\left(\Lambda z - \frac{2GL + \vartheta + \varsigma - 2\tau}{2}\right)}$$

$$\int_{-\infty}^{+\infty} d\nu e^{-iD\nu z} \times \begin{bmatrix} \hat{a}_{1e}^\dagger\left(\nu + \frac{\nu_p + \Omega_p}{2}\right) \\ \hat{a}_{1o}^\dagger\left(-\nu + \frac{\nu_p + \Omega_p}{2}\right) + \\ \hat{a}_{2e}^\dagger\left(-\nu + \frac{\nu_p + \Omega_p}{2}\right) \\ \hat{a}_{2o}^\dagger\left(-\nu + \frac{\nu_p + \Omega_p}{2}\right) \end{bmatrix}$$

$$\begin{bmatrix} e^{i\nu(\vartheta)}e^{-i\frac{\nu_p+\Omega_p}{2}(\varsigma)} + \\ e^{-i\nu(\vartheta)}e^{i\frac{\nu_p+\Omega_p}{2}(\varsigma)} \end{bmatrix} \begin{bmatrix} \hat{a}_{1e}^\dagger\left(\nu + \frac{\nu_p + \Omega_p}{2}\right) \\ \hat{a}_{2o}^\dagger\left(-\nu + \frac{\nu_p + \Omega_p}{2}\right) + \\ \hat{a}_{2e}^\dagger\left(\nu + \frac{\nu_p + \Omega_p}{2}\right) \\ \hat{a}_{1o}^\dagger\left(-\nu + \frac{\nu_p + \Omega_p}{2}\right) \end{bmatrix}$$

$$\begin{bmatrix} e^{i\nu(\vartheta)}e^{-i\frac{\nu_p+\Omega_p}{2}(\varsigma)} - \\ e^{-i\nu(\vartheta)}e^{i\frac{\nu_p+\Omega_p}{2}(\varsigma)} \end{bmatrix}|0\rangle +$$

$$\frac{Ce^{-i\left(\frac{\Omega_p}{2}\right)\varsigma}}{4} \int_{-L}^{0} dz \int_{0}^{+\infty} d\nu_p E_p^{(+)}(\nu_p)$$

$$e^{i\nu_p(\Lambda z - \frac{\varsigma}{2})} \int_{-\infty}^{+\infty} d\nu e^{-iD\nu z} \times$$

$$\left\{\begin{bmatrix} \hat{a}_{1e}^\dagger\left(\nu + \frac{\nu_p + \Omega_p}{2}\right) \\ \hat{a}_{1o}^\dagger\left(-\nu + \frac{\nu_p + \Omega_p}{2}\right) \\ \hat{a}_{2e}^\dagger\left(-\nu + \frac{\nu_p + \Omega_p}{2}\right) \\ \hat{a}_{2o}^\dagger\left(-\nu + \frac{\nu_p + \Omega_p}{2}\right) \end{bmatrix}(e^{i\nu\varsigma} + e^{-i\nu\varsigma}) + \begin{bmatrix} \hat{a}_{1e}^\dagger\left(\nu + \frac{\nu_p + \Omega_p}{2}\right) \\ \hat{a}_{2o}^\dagger\left(-\nu + \frac{\nu_p + \Omega_p}{2}\right) \\ \hat{a}_{2e}^\dagger\left(\nu + \frac{\nu_p + \Omega_p}{2}\right) \\ \hat{a}_{1o}^\dagger\left(-\nu + \frac{\nu_p + \Omega_p}{2}\right) \end{bmatrix}(e^{i\nu\varsigma} + e^{-i\nu\varsigma})\right\}|0\rangle$$

The probabilities $P_{1e1o}$, $P_{1e2o}$, $P_{2e1o}$ and $P_{2e2o}$ can therefore be expressed as:

$$P_{iejo}(\varsigma) = \frac{2HOM_{iejo}(\varsigma) + 2MZ_{iejo}(\vartheta, \varsigma) - I_{iejo}(\tau, \vartheta, \varsigma)}{\sum_{i,j}^{2}[HOM_{iejo}(\varsigma) + PBMZ_{iejo}(\vartheta, \varsigma) - I_{iejo}(\tau, \vartheta, \varsigma)]} \quad (19)$$

where the indices i and j can assume values of "1" or "2", and where the following hold:

$$HOM_{1e1o}(\varsigma) = \left[1 + Tri\left(\frac{\varsigma}{DL}\right)e^{-2\sigma_p^2\frac{\Lambda^2}{D^2}\varsigma^2}\right] \quad (20)$$

$$HOM_{2e2o}(\varsigma) = \left[1 + Tri\left(\frac{\varsigma}{DL}\right)e^{-2\sigma_p^2\frac{\Lambda^2}{D^2}\varsigma^2}\right]$$

$$HOM_{1e2o}(\varsigma) = \left[1 - Tri\left(\frac{\varsigma}{DL}\right)e^{-2\sigma_p^2\frac{\Lambda^2}{D^2}\varsigma^2}\right]$$

$$HOM_{2e1o}(\varsigma) = \left[1 - Tri\left(\frac{\varsigma}{DL}\right)e^{-2\sigma_p^2\frac{\Lambda^2}{D^2}\varsigma^2}\right]$$

$$PBMZ_{1e1o}(\vartheta, \varsigma) = 1 + \text{Cos}(\Omega_p\zeta)Tri\left(\frac{\vartheta}{DL}\right)e^{-\frac{\sigma_p^2}{2}\left(2\frac{\Lambda\vartheta}{D} - \varsigma\right)^2}$$

$$PBMZ_{2e2o}(\vartheta, \varsigma) = 1 + \text{Cos}(\Omega_p\zeta)Tri\left(\frac{\vartheta}{DL}\right)e^{-\frac{\sigma_p^2}{2}\left(2\frac{\Lambda\vartheta}{D} - \varsigma\right)^2}$$

$$PBMZ_{1e2o}(\vartheta, \varsigma) = 1 - \text{Cos}(\Omega_p\zeta)Tri\left(\frac{\vartheta}{DL}\right)e^{-\frac{\sigma_p^2}{2}\left(2\frac{\Lambda\vartheta}{D} - \varsigma\right)^2}$$

$$PBMZ_{2e1o}(\vartheta, \varsigma) = 1 - \text{Cos}(\Omega_p\zeta)Tri\left(\frac{\vartheta}{DL}\right)e^{-\frac{\sigma_p^2}{2}\left(2\frac{\Lambda\vartheta}{D} - \varsigma\right)^2}$$

$$I_{1e1o}(\tau, \vartheta, \varsigma) = -I_{2e2o}(\tau, \vartheta, \varsigma) = -\text{Sin}\left[\Omega_p\left(\frac{2\tau - \vartheta - \varsigma}{2}\right) - 2L(K_e + K_o)\right]$$

-continued $$\left\{ +Tri\left(\frac{\vartheta+\varsigma}{2DL}\right)\left[e^{-\frac{\sigma_p^2}{2}\left[\frac{\Lambda}{D}(\vartheta+\varsigma)-\frac{2GL+\vartheta+\varsigma-2\tau}{2}\right]^2}\right] + \right.$$
$$\left. Tri\left(\frac{\vartheta-\varsigma}{2DL}\right)\left[e^{-\frac{\sigma_p^2}{2}\left[\frac{\Lambda}{D}(\vartheta+\varsigma)+\frac{2GL+\vartheta-\varsigma-2\tau}{2}\right]^2}\right] \right\} -$$

$$Sin\left[\Omega_p\left(\frac{2\tau-\vartheta+\varsigma}{2}\right) - 2L(K_e + K_o)\right]$$

$$\left\{ +Tri\left(\frac{\vartheta+\varsigma}{2DL}\right)\left[e^{-\frac{\sigma_p^2}{2}\left[\frac{\Lambda}{D}(\vartheta+\varsigma)+\frac{2GL+\vartheta-\varsigma-2\tau}{2}\right]^2}\right] + \right.$$
$$\left. Tri\left(\frac{\vartheta-\varsigma}{2DL}\right)\left[e^{-\frac{\sigma_p^2}{2}\left[\frac{\Lambda}{D}(\vartheta+\varsigma)+\frac{2GL+\vartheta-\varsigma-2\tau}{2}\right]^2}\right] \right\}$$

$$I_{1e2o}(\tau,\vartheta,\varsigma) = -I_{2e1o}(\tau,\vartheta,\varsigma) = -Sin\left[\Omega_p\left(\frac{2\tau-\vartheta-\varsigma}{2}\right) - 2L(K_e+K_o)\right]$$

$$\left\{ -Tri\left(\frac{\vartheta+\varsigma}{2DL}\right)\left[e^{-\frac{\sigma_p^2}{2}\left[\frac{\Lambda}{D}(\vartheta+\varsigma)-\frac{2GL+\vartheta+\varsigma-2\tau}{2}\right]^2}\right] + \right.$$
$$\left. Tri\left(\frac{\vartheta-\varsigma}{2DL}\right)\left[e^{-\frac{\sigma_p^2}{2}\left[\frac{\Lambda}{D}(\vartheta-\varsigma)-\frac{2GL+\vartheta+\varsigma-2\tau}{2}\right]^2}\right] \right\} -$$

$$Sin\left[\Omega_p\left(\frac{2\tau-\vartheta+\varsigma}{2}\right) - 2L(K_e + K_o)\right]$$

$$\left\{ -Tri\left(\frac{\vartheta+\varsigma}{2DL}\right)\left[e^{-\frac{\sigma_p^2}{2}\left[\frac{\Lambda}{D}(\vartheta+\varsigma)-\frac{2GL+\vartheta-\varsigma-2\tau}{2}\right]^2}\right] + \right.$$
$$\left. Tri\left(\frac{\vartheta-\varsigma}{2DL}\right)\left[e^{-\frac{\sigma_p^2}{2}\left[\frac{\Lambda}{D}(\vartheta+\varsigma)+\frac{2GL+\vartheta-\varsigma-2\tau}{2}\right]^2}\right] \right\}$$

Figure 13:
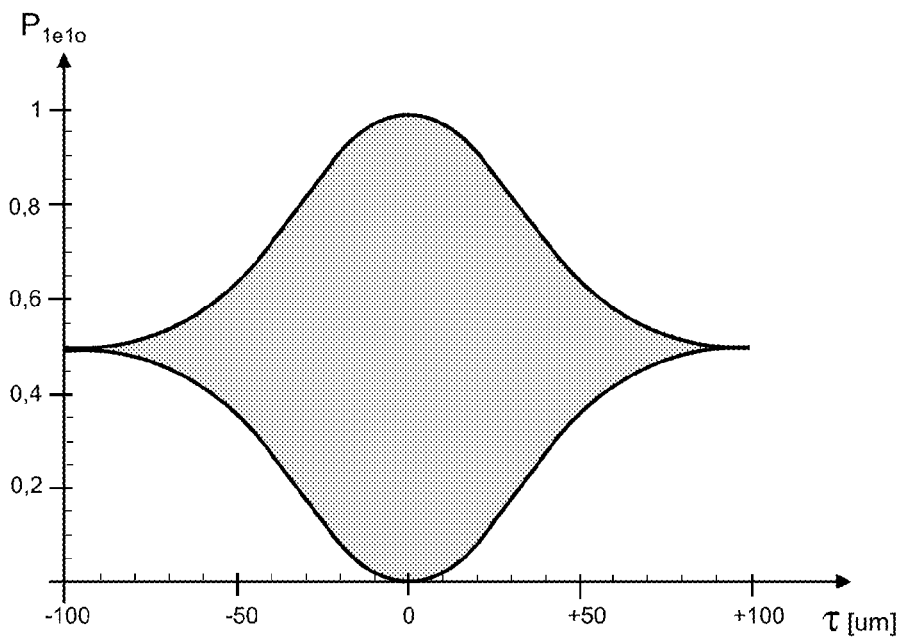
FIG. 13 shows the envelope profile of a probability density function related to the outputs of the interferometer shown in FIG. 12.
Figure 14:
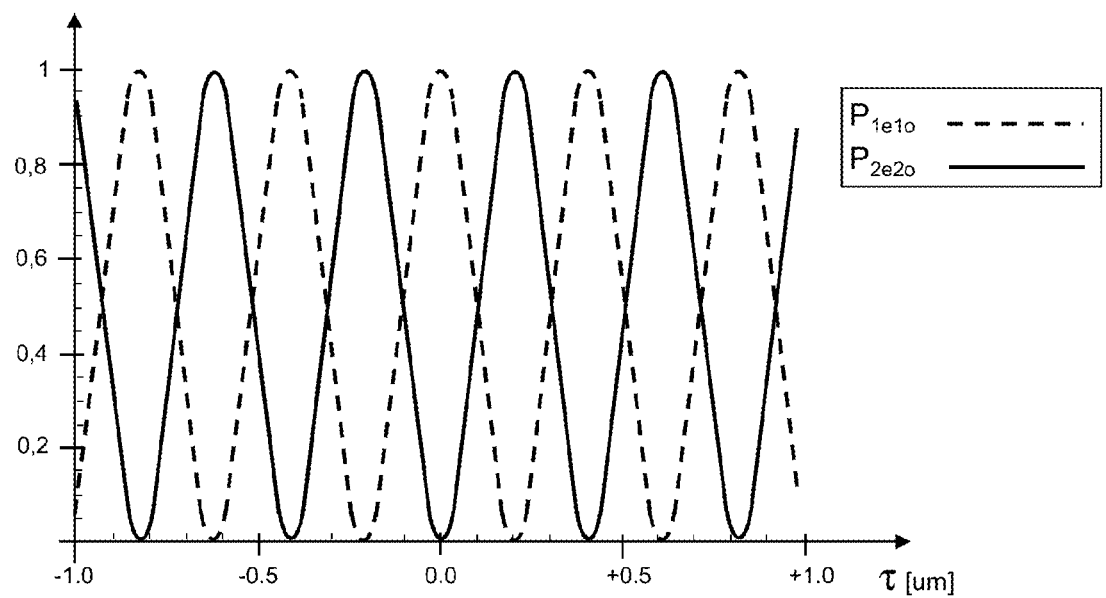
FIG. 14 shows probability density functions related to the outputs of the interferometer shown in FIG. 12.

With reference to equation (19), FIG. 13 shows an envelope of probability $P_{1e1o}$ as a function of $\tau$, obtained for $\theta=0$ and $\zeta=0$. Moreover, FIG. 14, also obtained for $\theta=0$ and $\zeta=0$, shows, as a function of $\tau$, the probabilities $P_{1e1o}$ and $P_{2e2o}$. In practice, the output state from the second interferometer beam splitter 98 can be expressed by formula (17) for the second embodiment as well.

The advantages that can be obtained with the present interferometer clearly emerge from the foregoing description. In particular, the present interferometer enables controlling the coalescence of a pair of photons, and in particular the probabilities with which a pair of coalescent photons is emitted from the first or from the second output of the second interferometer beam splitter 98. In other words, the present interferometer functions as an electronically controllable two-photon switch.

Finally, it is clear that changes and modifications can be made to the described interferometer without leaving the scope of protection of the present invention.

The invention claimed is:

1. An interferometer system comprising:
   an optical source configured to generate a first pump pulse and a second pump pulse coherent with each other and shifted in time by a delay;
   a first interferometer configured to receive the first pump pulse and generate an antisymmetric state with two coalescent photons $(1/\sqrt{2}(|2_1,0_2\rangle - |0_1,2_2\rangle))$; and
   a second interferometer configured to receive the second pump pulse and to generate a symmetric state with two coalescent photons $(1/\sqrt{2} \cdot (|2_1,0_2\rangle_+|0_1,2_2\rangle))$;
   said interferometer system being configured to control the probabilities with which two coalescent photons are emitted from a first output or a second output of the second interferometer;
   wherein the first and second interferometers are connected so that the interferometer system is configured to output a final state equal to a weighted sum of the antisymmetric state and the symmetric state $(1/\sqrt{2} \cdot (|2_1,0_2\rangle + |0_1, 2_2\rangle) + e^{i\tau}1/\sqrt{2}, \cdot (|2_1,0_2\rangle - |0_1,2_2\rangle))$, the weights of the sum being a function of the delay,
   wherein the first and second interferometers define a first optical path and a second optical path; and wherein the second interferometer comprises a first crystal of the optically non-linear type and configured to receive the second pump pulse, and first and second optical beam splitters, the first and second optical paths extending between the first crystal and the second optical beam splitter, the first optical beam splitter being interposed between the first crystal and the second optical beam splitter, and being crossed by the first and second optical paths.

2. The interferometer system according to claim 1, wherein the first interferometer comprises the second optical beam splitter and a second crystal of the optically non-linear type and configured to receive the first pump pulse, the second crystal being crossed by the first and second optical paths and being interposed between the first and second optical beam splitters.

3. The interferometer system according to claim 2, wherein the first and second crystals are adapted to emit a first and a second pair of photons, respectively, upon the reception of the second and first pump pulses, respectively; and wherein the first and second optical paths are such that, considered any one of the first and second pairs of photons, a photon of the considered pair is emitted along the first optical path, and the other photon is emitted along the second optical path.

4. The interferometer system according to claim 3, wherein the second interferometer comprises first optical delay means arranged along the first optical path, interposed between the first crystal and the first optical beam splitter, and adapted to delay in an electronically controllable manner the photon of the first pair of photons that propagates along the first optical path.

5. The interferometer system according to claim 4, wherein the first interferometer comprises second optical delay means arranged along the first optical path, interposed between the second crystal and the second optical beam splitter, and adapted to delay in an electronically controllable manner the photons of the first and second pairs of photons that propagate along the first optical path.

6. The interferometer system according to claim 2, further comprising first and second birefringent optical elements, the first and second crystals and first and second birefringent optical elements having respective optical axes; the first and second birefringent optical elements are arranged along the first and second optical paths, respectively, are interposed between the first and second crystals and have the same length, equal to the length of the second crystal, each of the first and second birefringent optical elements further having a position that corresponds to the position of the second crystal, rotated by approximately 90° about the optical axis.

7. The interferometer system according to claim 1, wherein the first optical beam splitter is of the polarizing or 50/50 type.

8. The interferometer system according to claim 1, wherein the first interferometer forms a Hong-Ou-Mandel interferometer.

* * * * *